United States Patent
Sakamoto et al.

(10) Patent No.: US 9,859,709 B2
(45) Date of Patent: Jan. 2, 2018

(54) APPARATUS FOR CONTROLLING POWER SUPPLIED TO ON-VEHICLE ELECTRICAL LOADS

(75) Inventors: Akira Sakamoto, Obu (JP); Kazuyoshi Obayashi, Chita-gun (JP)

(73) Assignee: DENSO CORPORATION, Kariya (JP)

( * ) Notice: Subject to any disclaimer, the term of this patent is extended or adjusted under 35 U.S.C. 154(b) by 840 days.

(21) Appl. No.: 13/095,334

(22) Filed: Apr. 27, 2011

(65) Prior Publication Data
US 2011/0278920 A1 Nov. 17, 2011

(30) Foreign Application Priority Data

Apr. 27, 2010 (JP) ................................. 2010-101695
Mar. 14, 2011 (JP) ................................. 2011-055635

(51) Int. Cl.
*H02J 3/14* (2006.01)
*B60L 1/00* (2006.01)
*B60L 11/18* (2006.01)

(52) U.S. Cl.
CPC ...... *H02J 3/14* (2013.01); *B60L 1/00* (2013.01); *B60L 11/184* (2013.01);
(Continued)

(58) Field of Classification Search
CPC ...... B60W 10/06; B60W 10/08; B60W 20/00; B60W 2510/244; F02B 39/00;
(Continued)

(56) References Cited

U.S. PATENT DOCUMENTS 5,467,006 A 11/1995 Sims
5,524,446 A 6/1996 Hotta et al.
(Continued)

FOREIGN PATENT DOCUMENTS

JP A-6-225404 8/1994
JP B2-3126773 11/2000
(Continued)

OTHER PUBLICATIONS

Morrison, R. (2008). The future is now: Grid-tied electric vehicles. New Hampshire Business Review, 30(10), 44(1). Retrieved from https://dialog.proquest.com/professional/professional/docview/676608323?accountid=142257.*
Jun. 5, 2012 Japanese Office Action issued in Japanese Patent Application No. 2011-055635 (with translation).

*Primary Examiner* — Michael P Harrington
(74) *Attorney, Agent, or Firm* — Oliff PLC

(57) ABSTRACT

A power control apparatus is applied to a vehicle provided with a receiving port connected with an external power supply device placed outside the vehicle and on-vehicle electrical loads including a second battery which stores power supplied from the external power supply device via the receiving port. The power control apparatus for vehicles has power supply processing means that performs a power supply process for supplying desired power to the loads during a stop of the vehicle. This power supply processing means predicts cost required to supply the desired power, based on future predicted power cost information, in planning a power supply process needed during the stop of the vehicle. This planned power supply process is performed.

22 Claims, 15 Drawing Sheets

(52) U.S. Cl.
CPC ....... *B60L 11/1824* (2013.01); *B60L 11/1838* (2013.01); *B60L 2240/525* (2013.01); *B60L 2260/50* (2013.01); *B60L 2260/54* (2013.01); *B60L 2260/56* (2013.01); *H02J 2003/146* (2013.01); *Y02B 70/3225* (2013.01); *Y02T 10/7005* (2013.01); *Y02T 10/7072* (2013.01); *Y02T 90/121* (2013.01); *Y02T 90/128* (2013.01); *Y02T 90/14* (2013.01); *Y02T 90/163* (2013.01); *Y02T 90/169* (2013.01); *Y04S 20/222* (2013.01); *Y04S 20/224* (2013.01); *Y04S 30/14* (2013.01)

(58) Field of Classification Search
CPC . B60L 11/1825; B60L 2240/36; G06Q 20/32; H02P 21/06; H02P 27/08
See application file for complete search history.

(56) References Cited

U.S. PATENT DOCUMENTS

| | | | |
|---|---|---|---|
| 2009/0115251 A1* | 5/2009 | Nakamura et al. | 307/32 |
| 2009/0192655 A1 | 7/2009 | Ichikawa et al. | |
| 2009/0246596 A1* | 10/2009 | Sridhar | B60L 11/1816 429/513 |
| 2009/0315393 A1* | 12/2009 | Yeh | 307/10.1 |
| 2010/0217485 A1 | 8/2010 | Ichishi | |
| 2011/0191220 A1* | 8/2011 | Kidston et al. | 705/34 |

FOREIGN PATENT DOCUMENTS

| | | |
|---|---|---|
| JP | 2008-304337 A | 12/2008 |
| JP | A-2009-248644 | 10/2009 |
| JP | 2010-088147 A | 4/2010 |

* cited by examiner

APPARATUS FOR CONTROLLING POWER SUPPLIED TO ON-VEHICLE ELECTRICAL LOADS

CROSS REFERENCE TO RELATED APPLICATIONS

This application is based on and claims the benefit of priority from earlier Japanese Patent Application Nos. 2010-101695 filed Apr. 27, 2010 and 2011-55635 filed Mar. 14, 2011, the description of which is incorporated herein by reference.

BACKGROUND OF THE INVENTION

Technical Field

The present invention relates to a power control apparatus for vehicles, which controls power to be supplied to on-vehicle electric loads including a secondary battery capable of storing therein power supplied from an external power source via a receiving port.

Related Art

In the past, as a power control apparatus for vehicles, an apparatus described in Japanese Patent Laid-open Publication No. 2009-248644 has been known, for instance. The power control apparatus described in this publication turns its focus toward plug-in hybrid vehicles. This control apparatus discloses a technique of making a comparison between costs necessary for charging a battery with electric energy produced by a generator which converts rotation energy of an internal combustion engine into electric energy and costs necessary for charging the battery with power supplied from a power supply placed outside of the vehicle. Using this technique, when the vehicle is stopped, either consumption of fuel caused by driving the internal combustion engine or consumption of power from the external power supply, whichever costs less, can be selected for use in the vehicle.

Meanwhile, energy costs, such prices of fuels including gasoline, usually vary from hour to hour. Hence, even when power, which is considered less-cost during a stop of the vehicle during which it is necessary to process a power demand from on-vehicle electrical loads, it is not always true that power cost involved in the process for the actual power supply is inexpensive. In addition, it is frequent that electronic devices, such as an air-conditioner or a navigation system, need to be operated during a stop of the vehicle. In such cases, a conventional apparatus gives consideration to costs only for charging the battery. It is also not always true that the power cost is low as a whole.

SUMMARY OF THE INVENTION

The present invention has been made to solve the foregoing problems, and an object of the present invention is to provide a power control apparatus for vehicles, in which the power control apparatus is able to save power cost by reducing cost necessary for a process to supply power to electric loads mounted on a vehicle, the electric loads including a secondary battery which stores therein power supplied from an external power source via a receiving port.

Hereinafter, means for solving the above object and its advantages will now be described.

The invention according to the first claim provides, as its primary configuration, a power control apparatus for vehicles, which is applied to a vehicle provided with a receiving port connected to an external power supply device placed outside the vehicle and on-vehicle electric loads including a second battery storing therein power supplied from the external power supply device, comprising: power supply processing means performing a power supply process while the vehicle is stopped, the power supply process being used for supplying the electric loads with a desired power while the vehicle is stopped, wherein the power supply process means includes: planning means for planning the power supply process for the stop of the vehicle through prediction of cost required for supplying the desired power, the prediction being based on predicted power cost information for the future; and performance means for performing a process planned by the planning means.

According to this configuration, the predicted power cost information can be used to plan the power supply process, with the process performed. Hence, in consideration of power cost always changing, it is possible to match timing when the power supply process is actually performed during a vehicle stop to timing when the power cost is low. As a result, the power cost required for the power supply process during the vehicle stop can be reduced.

Preferably, the predicted power cost information includes information indicative of fluctuations in cost of power supplied via the receiving port, the fluctuations being at intervals shorter than one day. The cost of power supplied from the receiving port is that of, for example, the commercial power source and a photovoltaic unit mounted on houses. Of these the power cost from the commercial power source changes even in one day. The power from the photovoltaic unit is limited in its available time during the day, at no cost except for installation cost for the unit. It is therefore considered that the cost of power from the receiving port changes at intervals shorter than one day. In the present invention, changes in the power cost at intervals shorter than one day are included in the predicted power cost information.

Still preferably, the predicted power cost information includes information indicative of power cost in an overall duration from the current time instant to a time instant at which the vehicle is predicted to start next. Thus, using the above predicted power cost information through the above overall usage duration, the planning can be performed appropriately.

Further, the planning means may decide both an amount of power supplied from the receiving port to the electric loads and a time instant at which the power is to be supplied to the electric loads, based on the predicted power cost information.

Further, the on-vehicle electric loads include, besides the secondary battery, on-vehicle electronic devices, and the planning means may decide, based on the predicted power cost information, whether or not power to be supplied via the receiving port should be used as the power to be supplied to the on-vehicle electronic devices or power stored in the secondary battery should be used as the power to be supplied to the on-vehicle electronic devices.

The cost of power from the receiving port depends on its supply timing. In contrast, the cost of power stored in the secondary battery can be suppressed from changing to a certain extent by adjusting its storage timing. In consideration of this point, it is better to have the foregoing two options for supplying power to the on-vehicle electronic devices.

Incidentally if the on-vehicle electronic devices are designed such that periods of power supply to the devices during a vehicle stop can be designated, estimating use of power stored in the secondary battery is particularly significant.

"The power stored in the secondary battery" may be power stored in the secondary battery by being supplied from the receiving port through the power supply process for a vehicle stop, prior to supplying power to the on-vehicle electronic devices."

According to another aspect, the vehicle has an internal combustion engine and conversion means for converting rotation energy generated by the engine to electric energy, and the planning means decides, based on the predicted power cost information, whether or not power to be supplied via the receiving port should be used as the power to be supplied to the on-vehicle electric loads or the rotation energy from the engine, which is converted by the conversion means, should be used as the power to be supplied to the on-vehicle electric loads. In this invention, the cost of power generated by driving the internal combustion engine even when the vehicle is stopped is compared with the cost of power from the receiving port. This makes it possible to further reduce cost necessary for the power supply process during a vehicle stop.

Further, the on-vehicle electric loads includes, besides the secondary battery, a temperature reducing device for reducing a temperature in a vehicle interior of the vehicle, the vehicle is provided with a power conversion circuit driving a rotary machine provided in the temperature reducing device and having an output to which the receiving port is electrically connected, wherein the power conversion circuit is functionally borrowed as means for charging the secondary battery with the power supplied from the receiving port, the power conversion circuit is positioned such that a temperature of the power conversion circuit can be reduced by driving the temperature reducing device, and the planning means including means for planning interruption of a process to reduce the temperature of the power conversion circuit, the process being performed by driving the temperature reducing device, the interruption of the process being performed within a duration during which the secondary battery is charged with the power supplied from the receiving port. By driving the power conversion circuit in order to charge the secondary battery, the temperature of the power conversion circuit will rise. In this configuration, the power conversion circuit is cooled down by driving the temperature reducing device, thus suppressing the temperature of the power conversion circuit from increasing.

In this case, the planning means may plan to charge the secondary battery such that energy stored in the secondary battery which is consumed by driving the temperature reducing device is compensated. Since driving the temperature reducing device consumes energy stored in the secondary battery, there will be caused an error in the storage amount of the secondary battery. In this regard, the invention allows the planning means to take such an error into consideration. It is therefore possible to suppress changes in the storage amount of the secondary battery.

Still preferably, the planning means can make an amount of energy for the compensation larger with an increase in an amount of energy to be charged into the secondary battery. The more the amount of energy charged in the secondary battery, the larger the amount of heat generated from the power conversion circuit. Hence, it is supposed that the amount of energy necessary to drive the temperature reducing device is also increased. This amount of energy equals an amount of energy consumed in accordance with the charging process for the secondary battery. The present invention considers this point, and adopts a scheme in which the larger the charging energy amount, the larger the compensation energy amount. This will prevent or reduce, in a reliable manner, occurrence of a situation where the amount of energy stored in the secondary battery is shifted from a desired one.

Further, the planning means may plan a reduction in interruption intervals at which the process is interrupted in cases where the power supplied from the receiving port is made larger in charging the secondary battery. It is considered that the larger the power from the receiving port, the higher the amount of heat from the power conversion circuit per unit time. By taking this into consideration, the interruption intervals are set.

According to a further aspect, the power supply processing means may perform the interruption of the process which is performed by driving the temperature reducing device, regardless of the power supply process planned by the planning means, in cases where the temperature of the power conversion circuit is over a threshold temperature. Hence, even if there is a difference in the power supply between the planned state and actually driven state, which is due to for example occurrence of a higher rise in the temperature of the power conversion circuit, contrary to the prediction, it is possible to cope with such an unintentional event in a reliable manner.

As another preferred mode, the on-vehicle electric loads include, besides the secondary battery, a temperature adjusting device for adjusting a temperature in a vehicle interior of the vehicle, the vehicle is provided with a power conversion circuit driving a rotary machine provided in the temperature adjusting device and having an output to which the receiving port is electrically connected, wherein the power conversion circuit is functionally borrowed as means for charging the secondary battery with the power supplied from the receiving port, and, the planning means includes means for, in cases where there is a request for ending adjustment of the temperature of the vehicle interior at a specified time instant, setting a driving period of the temperature adjusting device, the driving period being according to the request, to a charging prohibiting period of the secondary battery. When the temperature reducing device is driven, the power conversion circuit is also used to drive its rotary device, which means that charging the secondary battery with power from the receiving port cannot be performed. With this regard, such a difficulty can be overcome by the foregoing setting.

Still preferably, the on-vehicle electric loads includes, besides the secondary battery, a power conversion circuit for charging the secondary battery and a temperature adjusting device for adjusting a temperature in a vehicle interior of the vehicle, the temperature adjusting device has a function of cooling down a temperature of the power conversion circuit, and the planning means includes means for planning both interruption of a process in a duration during which the second battery is charged with power supplied from the receiving port, the process being for reducing the temperature of the power conversion circuit by driving the temperature adjusting device, and charging of the secondary battery such an amount of energy stored in the secondary battery, which is consumed by driving the temperature adjusting device, is compensated. In this configuration, driving the temperature reducing device consumes the energy of the secondary battery. Hence, to the amount of energy stored in the secondary battery, which is obtained when the charging with power from the receiving port is completed, the energy necessary to drive the temperature reducing device becomes an error cause. With consideration this, the present invention provides a plan to compensate at least part of the drive energy by the power from the receiving port.

The cost of power stored in the secondary battery is changeable to an extent by adjusting a time instant at which the charging starts. Hence, as the power to be supplied to the on-vehicle electronic devices, the power of the secondary battery is made reference to, thereby reducing the power cost for the power supply process performed while the vehicle is stopped.

Further, the apparatus may have charge request acquiring means for acquiring a charging request for the secondary battery in a period continuing until a start of an upcoming run of the vehicle, wherein the power supply processing means performs the power supply process for the vehicle stop based on the charging request acquired by the charge request acquiring means. The charge request acquiring means allows the apparatus to perform the charging process for the secondary battery can be performed well while the vehicle is stopped.

Still further, the charge request acquiring means is allowed to receive information indicative of a priority of the charging request from outside the apparatus, the power supply processing means can decide an amount of electric energy to be supplied to the secondary battery based on the priority of the charging request, when there is a request for requesting an amount of electric energy exceeding an amount of electric energy available for the on-vehicle electric loads in the period continuing until the start of the upcoming run of the vehicle. Because the priority of the charging request can be inputted from outside the apparatus, a user's request can be met appropriately.

Further, the apparatus may have drive request acquiring means for acquiring a drive request for on-vehicle electronic devices in a period continuing until a start of an upcoming run of the vehicle, the on-vehicle electronic devices belonging to the on-vehicle electric loads including the secondary battery, wherein the power supply processing means performs the power supply process while the vehicle is stopped, based on the drive request acquired by the drive request acquiring means. Providing the drive request acquiring means makes it possible to perform the drive process for on-vehicle electronic devices while the vehicle is stopped.

In the above configuration, the drive request acquiring means is allowed to receive information indicative of a priority of the drive request, and the power supply processing means can decide an amount of electric energy to be supplied to the on-vehicle electronic devices based on the priority of the drive request, when there is a request for requesting an amount of electric energy exceeding an amount of electric energy available for the on-vehicle electric loads in the period continuing until the start of the upcoming run of the vehicle. Hence, the priority of the drive request can be inputted from outside the apparatus, which meets a user's request in an appropriate manner.

Further, the apparatus can have inputting means through which a user's request is inputted, the user's request being at least one of a request for charging the secondary battery and a request for driving on-vehicle electronic devices included in the on-vehicle electric loads including the secondary battery, the user's request being inputted in a period continuing until a start of an upcoming run of the vehicle, and outputting means for outputting to the user information indicative of a limitation of an amount of electric energy to be supplied to the on-vehicle electric loads until the start of the upcoming run of the vehicle, if there is a request for requesting an amount of electric energy exceeding an amount of electric energy available for the on-vehicle electric loads in the period until the start of the upcoming run of the vehicle. Hence, the outputting means makes it possible a user to understand the fact the request cannot be met.

Still further, the on-vehicle electric loads include, besides the secondary battery, a temperature adjusting device adjusting a temperature in a vehicle interior of the vehicle, and the vehicle is provided with a power conversion circuit driving a rotary machine provided in the temperature adjusting device and having an output to which the receiving port is electrically connected, wherein the power conversion circuit is functionally borrowed as means for charging the secondary battery with the power supplied from the receiving port, the apparatus comprising inputting means through which a user's request and information indicative of a priority of the user's request are inputted, the user's request being at least one of a request for charging the secondary battery and a request for driving the temperature adjusting device, the user's request being inputted in a period continuing until a start of an upcoming run of the vehicle, and changing means for changing at least one of the requests for charging the secondary battery and driving the temperature adjusting device from the beginning depending on the priority, if an amount of energy requested for charging the secondary battery and driving the temperature adjusting device exceeds an amount of electric energy available for the on-vehicle electric loads in a period continuing until a start of an upcoming run of the vehicle.

In this configuration, in the drive period of the temperature adjusting device, the charging process for the secondary battery cannot be performed. It is therefore necessary to perform the charging process for the secondary battery in periods other than such drive period. However, when an energy amount requested by charging the secondary battery and driving the temperature adjusting device exceeds an available energy amount, both the charging and the drive requests cannot be met. With taking this into consideration, the inputting and changing means are provided, so that it is possible to plan well the power supply depending on priorities of both the charging and the drive.

DETAILED DESCRIPTION OF PREFERRED EMBODIMENTS

Hereinafter, referring to the accompanying drawings, embodiments of an apparatus for vehicles (hereinafter simply referred to a power control apparatus), which is according to the present invention and controls power supplied to on-vehicle electric loads (hereinafter simply referred to on-vehicle loads or loads), will now be described.

(First Embodiment)

With reference to FIG. 1-FIG. 6, a first embodiment of the power control apparatus of the present invention will now be described.

Figure 1:
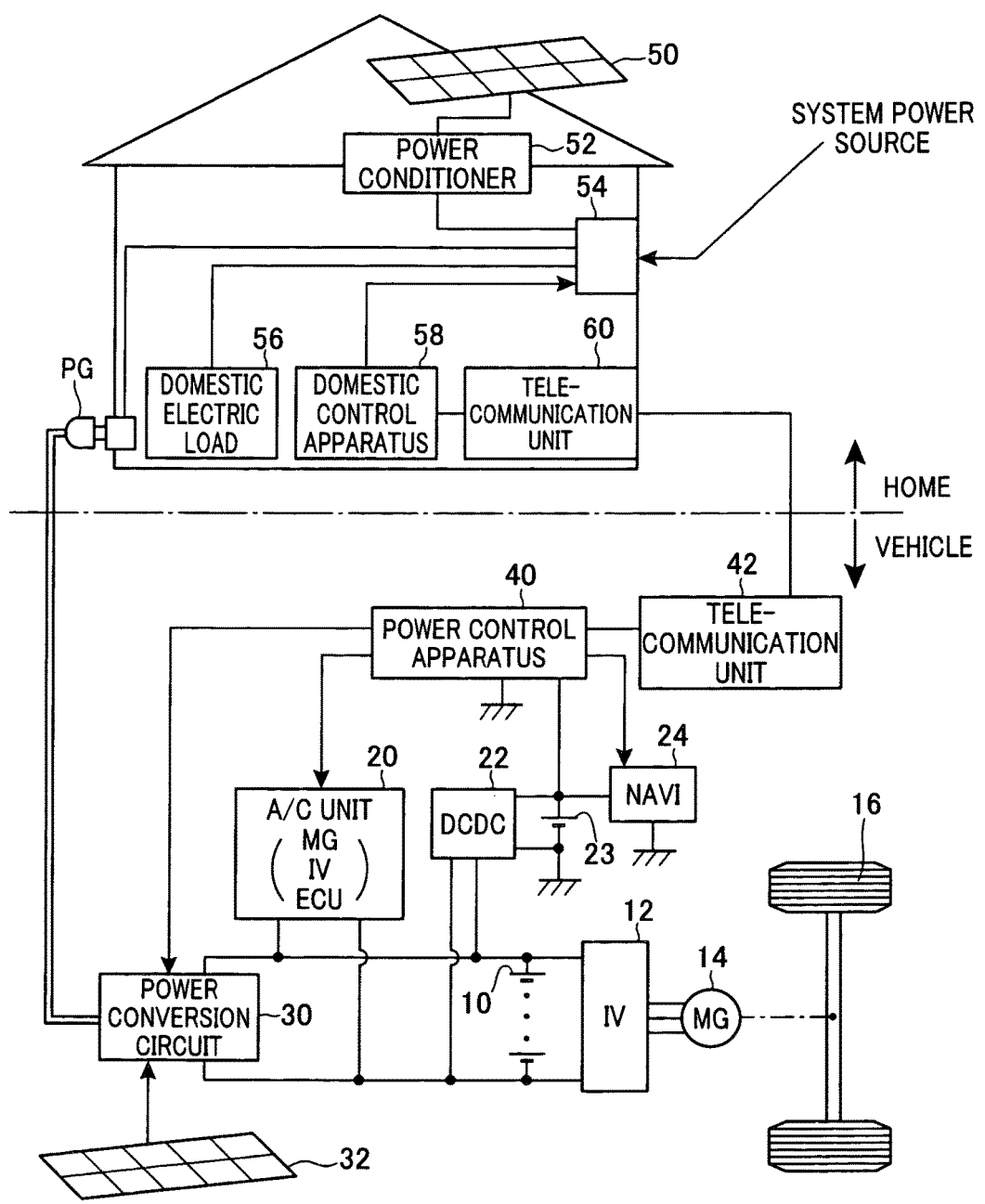
FIG. 1 is a diagram showing the configuration of a system according to a first embodiment of a power control apparatus according to the present invention.

FIG. 1 shows the system configuration of this power control apparatus. There is shown a high-voltage battery 10 which provides a predetermined high voltage (for example, a voltage of 100 V or more) serving as terminal voltage. The high-voltage battery 10 is electrically connected to a motor generator 14 via an inverter 12. The motor generator 14 serves as an on-vehicle primary machine and has a rotary shaft mechanically linked with driving wheels 15.

To the high-voltage battery 10, an air-conditioning unit 20, a DCDC converter 22, and a power conversion circuit 30 are electrically connected. The air-conditioning unit 20 is a control system, which is provided with a motor generator (MG) for providing a compressor with rotary energy, an inverter (IV), and an electronic control unit (ECU) which is formed to control controlled variables in the motor generator. The DCDC converter 22 serves as a step-down converter which steps down voltage of the high-voltage battery 10 and applies terminal voltage of a predetermined low voltage (for example, several volts to several tens of volts) to a low-voltage battery 23. The low-voltage battery 23 is connected to a navigation system 24.

The power driver circuit 30 is a member which converts alternating-current power supplied from external commercial power via a plug PG for supplying the converted power to the high-voltage battery 10, and/or which transforms power supplied from an on-vehicle photovoltaic generation panel 32 for supplying the converted power to the high-voltage battery 10.

Meanwhile the power control apparatus 40 is an electronic control unit which performs power control in a vehicle. Practically this apparatus controls charging to the high-voltage battery 10 by operating the power conversion circuit 30 through communication with outside devices via a telecommunication unit 42 and processes supply of power to the navigation system 24 and the air-conditioning unit 20.

The plug PG is an interface to supply, to the vehicle, power supplied from a domestic distribution board 54, and in the present embodiment, the plug is provided as a detachable member to the vehicle. Hence, the vehicle receives external power via a connecting port with the plug PG, which connecting port is a receiving port accordingly. Incidentally the plug PG may be provided as part of the vehicle, in which the plug also acts as a receiving port for power supplied from the outside.

The domestic distribution board 54 receives various types of power including power from the home photovoltaic generation panel 50 via a power conditioner 52 and power from the external commercial power source, and distributes the received power to domestic loads 56 which are in the house and/or loads outside the house. This distribution control itself is carried out by having a domestic control apparatus 58 operated toward the distribution board 54. Moreover, the domestic control apparatus 58 functions so as to communicate with the on-vehicle telecommunication unit 42 via a telecommunication unit 60.

Hereinafter, though various processes are performed by the on-vehicle power control apparatus 40, processes for power control performed during a stop of the vehicle will now be described as processes especially relating to the present invention.

Figure 2:
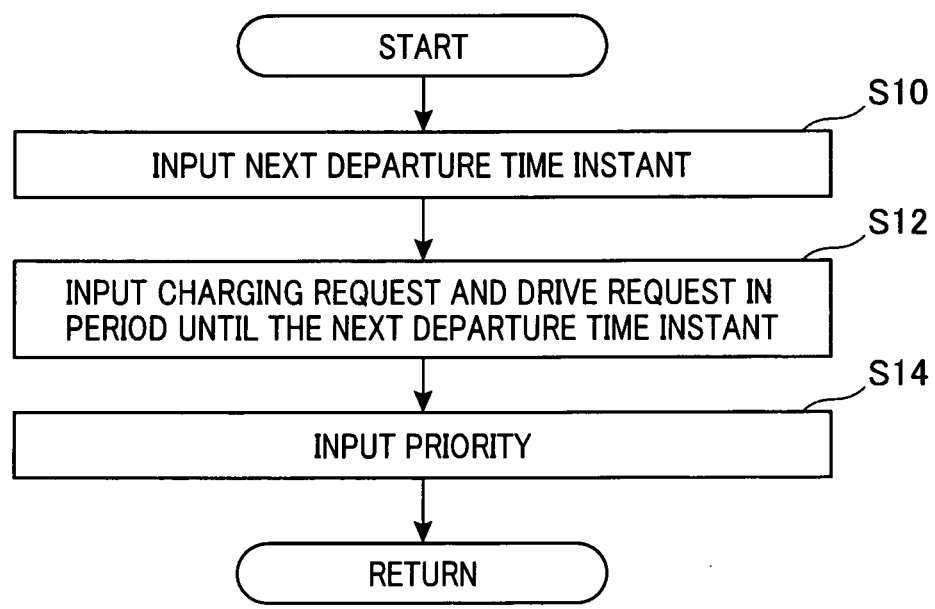
FIG. 2 is a flowchart showing the steps of a reception process of a user's request performed in the first embodiment.

FIG. 2 shows steps for a process receiving a user's request, which is performed during a stop of the vehicle. The power control apparatus 40 performs this process once during a stop of the vehicle, for example.

In the series of steps of this process, at step S10, a run start time for the next run (departure time) is inputted. Practically, this input can be carried out by allowing an on-vehicle interface, which is prepared for interfacing with a user, to accept, from a user, requests concerning the departure time. At the next step S12, a charging request for requesting charging in a period continuing until the next departure time and a drive request for on-vehicle electronic devices are inputted. These input actions can also be carried out by allowing an on-vehicle interface, which is prepared for interfacing with a user, to accept requests from the user.

The charging request may be inputted as the next destination inputted via, for example, the navigation system 24. In other words, it is possible from information showing the destination to obtain information about a travel distance to the current location and information about factors such as travel environment from the current location to the destination. Based on the travel distance information and the travel environment information, whether or not there is a charging request for the high-voltage battery 10 can be determined. As an alternative, instead of this manner, the vehicle system may provide a user, as displayed information, with a relationship between a necessary travel distance and a necessary residual capacity (SOC) of the high-voltage battery 10, such that the user enters a residual capacity requested for the high-voltage battery 10. This also makes it possible to determine whether or not there is a charging request based on a difference between the residual capacity requested and the current residual capacity.

In addition, the drive request may be an input indicating a temperature requested in the vehicle at the departure time, for instance. In this case, the generation of the drive request means that a request for driving the air-conditioning unit 20 has been generated to control the in-vehicle temperature since a time instant which is prior to a departure time by a predetermined period of time. Incidentally, electronic devices to be driven are not limited to the air-conditioning unit 20, but may be other devices including the navigation system 24. In other words, the drive request may include a request for rewriting data in the navigation system 24 during a vehicle stop.

Completion of processing at step S12 is followed by step S14, where a priority is inputted. This input can also be performed using an in-vehicle interface with users, where the interface urges a user to input the priority. The priority is composed of levels of priority used when both the charging request and the drive request are not met. Instead of this, the levels of priority may be levels of priority provided when the highest level of request cannot be met among, for example, the charging request and the drive request with some of the requests possible to be inputted.

When processing at step S14 is completed, the steps of this process are ended for this cycle.

Figure 3:
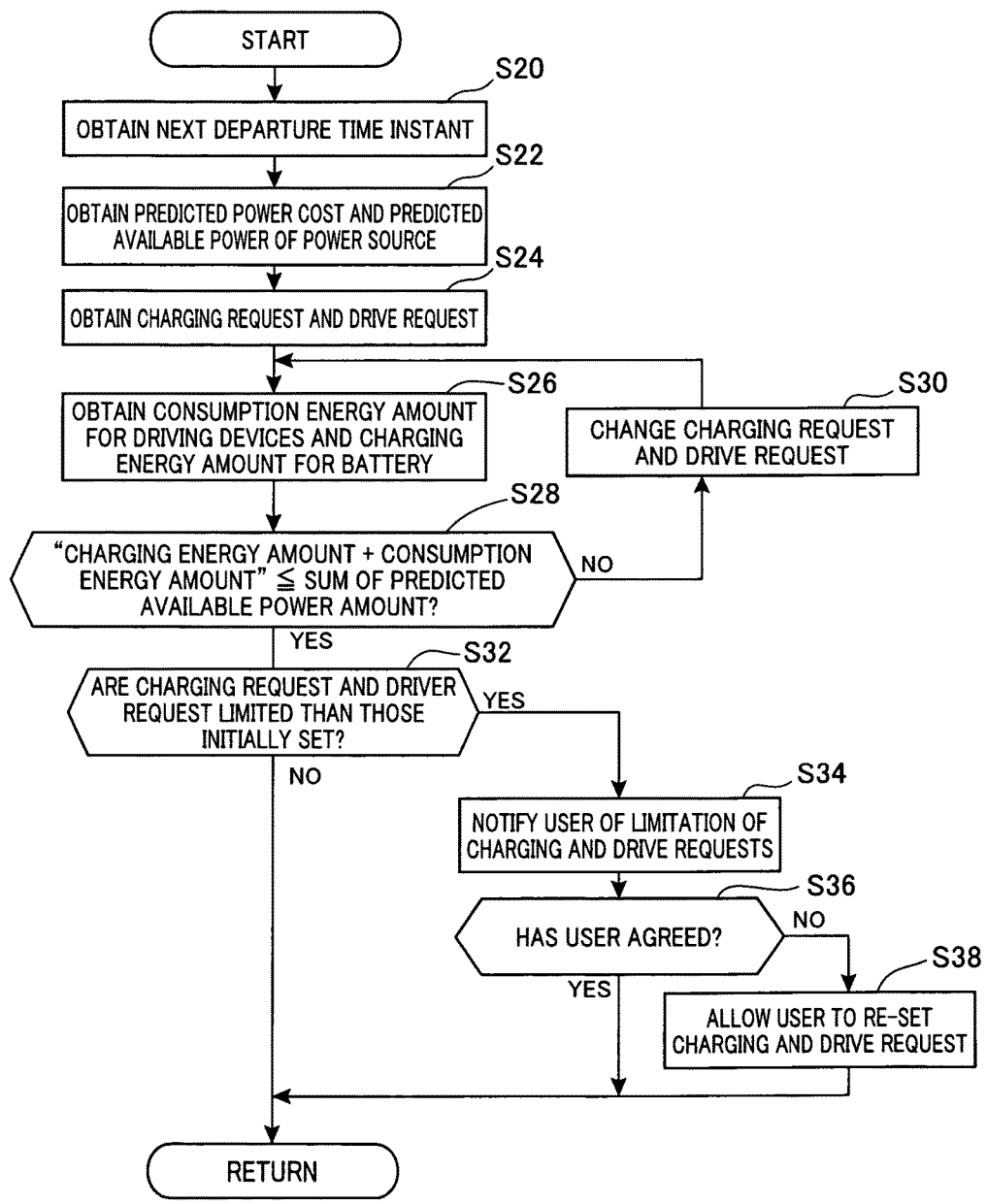
FIG. 3 is a flowchart showing the steps of a prediction process for the request performed in the first embodiment.

FIG. 3 shows the steps of a process to predict (or estimate) whether or not it is possible to reply to the charging request and the drive request. This process is performed by the power control apparatus 40 in response to a trigger which is for example completion of the process shown in FIG. 2.

The steps of this process start at step S20, where the departure time information for the next time, which was inputted at step S10 in FIG. 2, is obtained. At subsequent step S22, predicted power cost information predicted for an external power supply, which is taken in via the plug PG, and predicted available power information are obtained. Practically these two kinds of information are obtained from the domestic control apparatus 58 by using both the in-vehicle telecommunication unit 42 and the domestic telecommunication unit 50, which are shown in FIG. 1. The predicted available power information shows a predicted total power amount, which is a sum of an amount of power available via the plug PG and an amount of power available by the on-vehicle photovoltaic generation panel 32. The information regarding the amount of power available by the on-vehicle photovoltaic generation panel 32 can be obtained, for example, through prediction of a total available amount of power during a time slot during which the sunlight is available. It is preferred that this prediction takes into consideration various factors such as weather reports and locations. Meanwhile the total amount of power available via the plug PG is normally set to a fixed value when the power is supplied from a domestic outlet. Hence, in this case, instead of acquiring information form the domestic control apparatus 58, the power control apparatus 40 may memorize the fixed value in advance.

Additionally the predicted power cost information is information in which factors such as expense (cost) of power from the commercial power source during a duration from the current time instant to the next departure time instant is reflected. In general, the commercial power source is cheaper in the late night than the daytime. Hence, in cases where the commercial power source is continuously available during the foregoing period of time, the power cost during the late night is predicted on the late-night charge basis. Incidentally it is preferred that the "cost information" is quantified by currency or amounts proportional to the currency.

At subsequent step S24, both the charging request information and the drive request information are first obtained, which have been inputted at step S12 in FIG. 2. Then at step S14, an amount of energy consumed to drive the devices requested by the drive request and an amount of energy required to charge the high-voltage battery 10 in order to meet the charging request are obtained. In this process, it is not always necessary to make the power control apparatus 40 calculate the amount of energy consumption for driving the devices, but may be configured such that the air-conditioning unit 20 or other devices calculate it. In contrast, the amount of energy required to charge the high-voltage battery 10 is calculated based on a difference between a residual capacity required for the high-voltage battery 10 at the vehicle start, which is acquired from a travel distance and travel environments, and the current residual capacity of the high-voltage battery 10, when the charging request is set to the destination, for example. Incidentally each of the charging request and the drive request has been inputted at a plurality of levels together with the priority in processing shown in FIG. 2, the amounts of consumed and charging energy are calculated using the highest level of priority.

At subsequent step S28, it is determined whether or not the sum of the charging and consumed energy amounts is equal to or less than the summation of the predicted available power. This processing is performed to determine whether or not the foregoing charging and drive requests can be met. Incidentally the summation of the predicted available power is defined as a sum of both power amounts provided as a total power (electric energy amount) predicted as being available via the plug PG and a total power predicted as being available from the on-vehicle photovoltaic generation panel 32. When it is determined that the sum of the requested power is higher than the summation of the predicted available power, the charging and drive requests are changed at step S30. In the present embodiment, the change is made to lower-priority requests inputted through the foregoing process shown in FIG. 2. If there are no such lower-priority requests, the requests may be forcibly lowered in their priorities. When completing the processing at step S30, the processing returns to step to obtain an amount of consumption energy and an amount of charging energy in response to new requests.

In contrast, if an affirmative determination is made at step S28, it is further determined at step S32 whether or not the charging request and the drive request are limited more than those initially set. In other words, it is determined whether or not the amount of consumption energy and the amount of charging energy due to a YES determination at step S28 are in accordance with a charging request and a drive request which are changed through the processing at step S30. When it is determined that the requests have been limited, this fact that the charging and drive requests have been limited is notified outside the vehicle (to a user). If the user does not agree with this notification (NO at step S36), the processing at step S38 urges the user to re-set the charging and drive requests.

When it is negatively determined at step S32 and it is affirmatively determined at step S36, and the processing at step S38 is completed, the foregoing steps are ended for this cycle.

Figure 4:
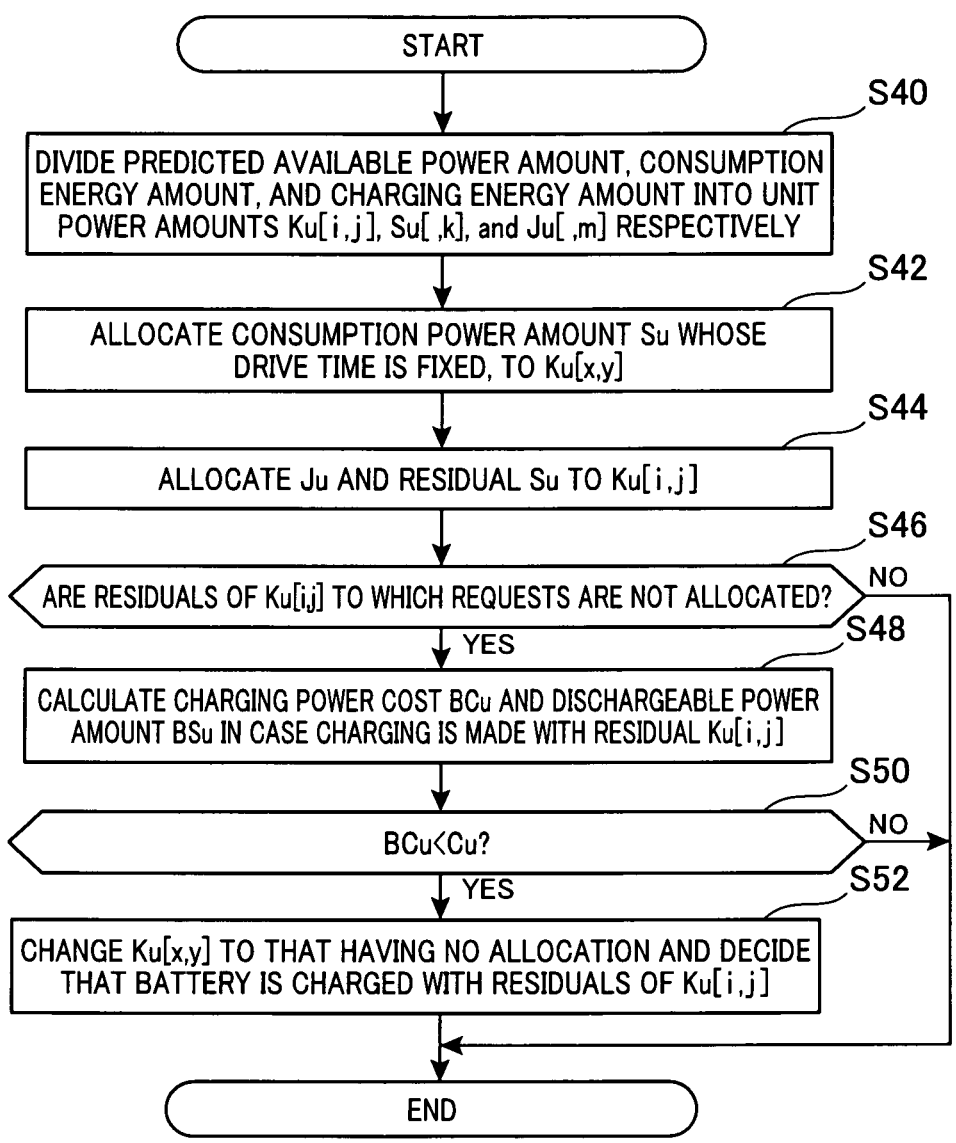
FIG. 4 is a flowchart showing the steps of a planning process of a power supply process performed during a vehicle's stop in the first embodiment.
Figure 5:
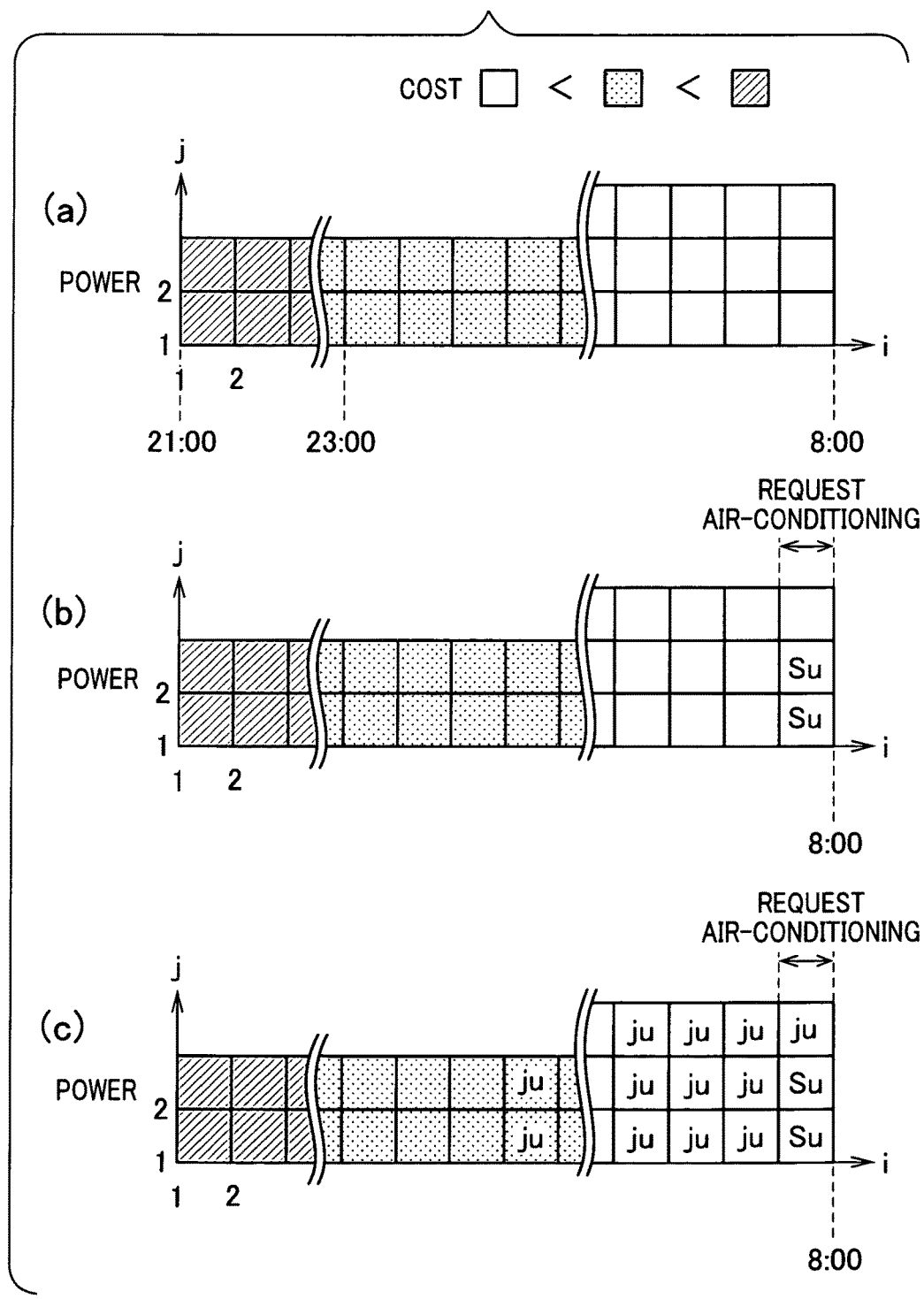
FIG. 5 is a diagram showing an example of a decision process.

FIG. 4 shows the steps of a process for planning a power supply process during a stop of the vehicle. This process is performed by the power control apparatus 40 in response to a trigger that the amounts of consumption energy and charging energy are decided through, for example, the foregoing process shown in FIG. 3.

The steps of this process starts at step S40, where the predicted available power amount obtained at step S22 in FIG. 3 and the amounts of consumption energy and charging energy decided through the steps of FIG. 3 are divided into a unit power amount (unit). At this step, the predicted available power is divided into unit power amounts Ku[i,j] to which two-dimensional addresses are assigned. FIG. 5(a) exemplifies the unit division of the predicted available power. As shown therein, the first-column address i of the unit power amounts Ku[i,j] of the predicted available power define a time slot in which the power can be supplied, and the second-column address j thereof defines the number of a unit power amount available during the time slot. The time slot designated by the first-column address is a time slot obtained by dividing a period of time from the current time instant to the next departure time instant by a predetermined period of time. The example shown in the drawing illustrates that an amount of power which is two times of the unit power amount is available at nine PM, 21:00, and an amount of power which is three-times of the unit power amount is available in a time slot just before at eight AM, 8:00.

Incidentally cost information is added to each of the unit power amounts Ku[i, j] based on predicted power costs obtained at step S22 in FIG. 3. In the example shown, the time slot close to 8:00 shows the least cost, which corresponds to power generated by both the residential photovoltaic generation panel 50 and the on-vehicle photovoltaic generation panel 32. In this time slot close to 8:00, the available power increases by a unit power amount, which results from power generated by the on-vehicle photovoltaic generation panel 32. In this situation, the plug PG is able to supply any one of the power from the residential photovoltaic generation panel 50 and the power from the commercial power source. However, since the power available via the plug PG is limited, the amount of power supplied via the plug PG does not change.

Meanwhile, the amounts of consumption energy and charging energy are also divided into unit power amounts Su[ ,k] and Ju[ ,m] with two-dimensional addresses respectively. However, the first-column addresses are blanked except for the unit consumption power Ju[x,y] whose drive time is designated. In the above, "amount of consumption energy =Su[ ,1]+Su[ ,2]+ . . . " and "amount of charging energy=Ju[ ,1]+Ju[ ,2]+ . . . ".

At step S42 shown in FIG. 4, of the divided consumption power amounts (unit power amount S[ ,k]), a power amount at which a time slot for driving a corresponding electronic device is fixed is allocated to the unit power amount K[x,y] in the time slot. FIG. 5(b) shows an example where two unit power amounts Su, in which consumption energy is divided, are the time slot just before eight, 8:00. This example is given in various situations such as a situation in which there is a request that the temperature in a vehicle interior reaches a desired temperature in a period continuing until a departure time.

At step S44 in FIG. 4, to the residual unit power amounts K[i, j], residual consumption amounts divided into the unit power amounts Su[ ,k] and charging energy amounts divided into the unit power amounts Ju[ ,m] are allocated. In this embodiment, of the residual unit power amounts K[i, j], unit power amounts with less power cost are used preferentially. FIG. 5(c) exemplifies this processing. In this example, it is assumed that the drive request is only a request that the temperature in the vehicle interior reaches a desired temperature in a period continuing until a departure time. In this example, since a sum of both the consumption energy amount and the charging energy amount is larger than a sum of the unit power amount K[i, j] having the lowest cost, part (two units) of the unit power amount Ju, in which the charging energy amount is divided, is allocated to the unit power amount K[i,j] having the second lowest cost.

Further at step S46 in FIG. 4, it is determined whether or not there are unit power amounts K[i,j] to which the consumption power and the charging power have not been allocated yet. If it is determined that there are such unit power amounts, the processing at steps S48 to S52 is performed, where processing is performed to check whether or not it is possible to further reduce cost by accepting power stored in the high-voltage battery 10, instead of accepting power supplied via the plug PG, for meeting the drive request. Practically at step S48, both a charging power cost BCu required to further charge the high-voltage battery 10 with the unit power amounts K[i,j] which are not allocated yet (i.e., the residual unit power amounts K[i,j]) and a dischargeable power amount BSu are calculated. The dischargeable power amount BSu is set to an amount equal to or less than the sum of consumption power amounts (the sum of K[x,y]) whose drive time slots are fixed. At the next step S50, the foregoing charging power cost BCu is compared with the sum of cost Cu[x,y] required to allocate the dischargeable power amount BSu to the unit power amount K[x,y] processed at step S42. When it is determined that the charging power cost BCu is less than the other, step S52 is processed where it is stopped to allocate an amount corresponding to the foregoing dischargeable power amount BSu, to the unit power amount K[x,y] decided by the processing at step S42. In addition, it is decided such that the high-voltage battery 10 is further charged with the residual unit power amount K[i,j] checked at step S48.

Incidentally, in cases where the processing at step S52 is completed or it is determined negatively at step S46 or S50, the processing is ended for this cycle.

Figure 6:
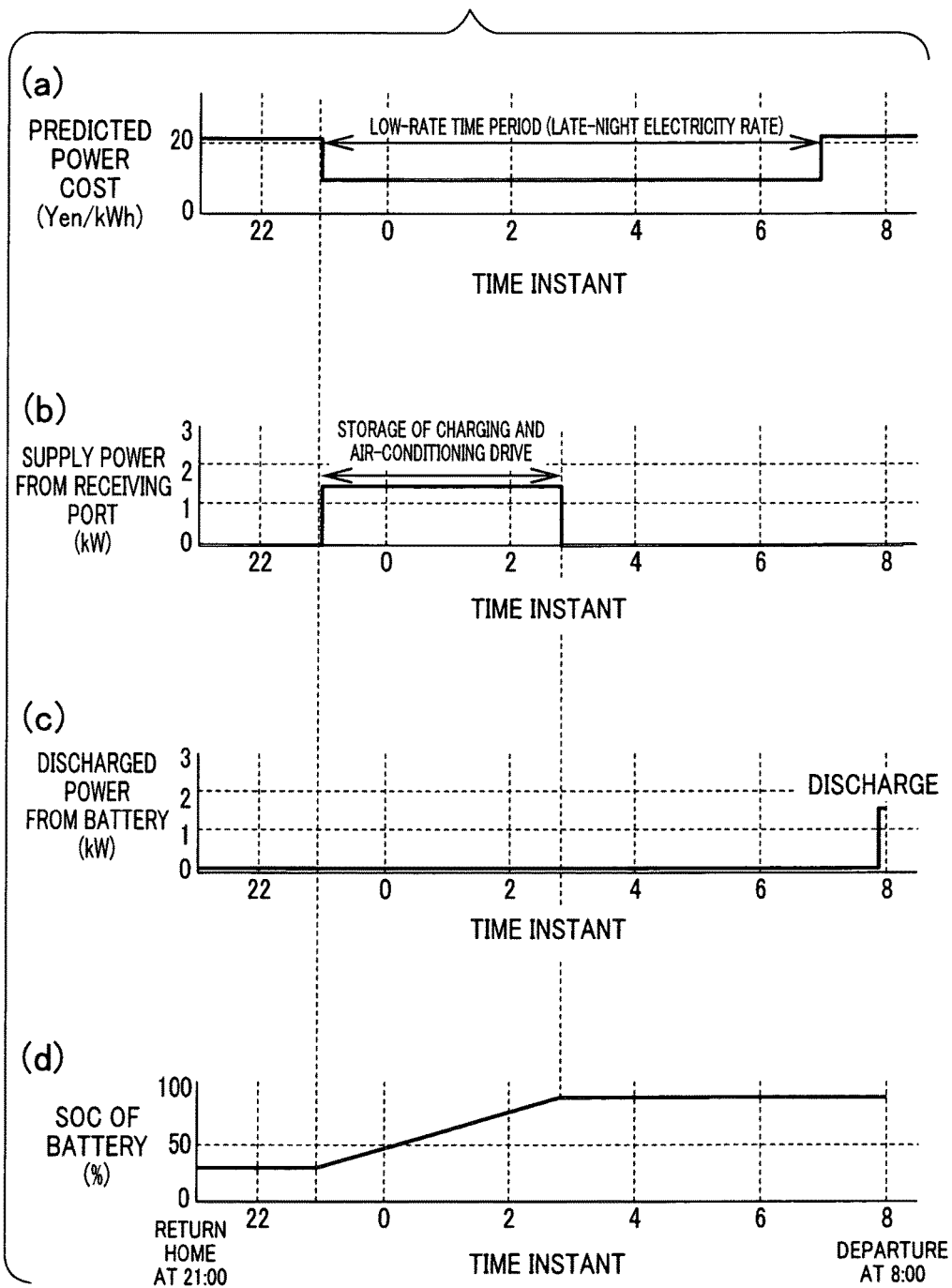
FIG. 6 is a diagram showing another example of the decision process.

FIG. 6 gives an example for processing power supply, in which the foregoing steps S48 to S52 are processed for planning to meet a drive request using the charging power of the high-voltage battery 10. In this example, assumptions are made about various situations including a situation where it is bad weather on a departure day so that the photovoltaic power generation is unavailable. To cope with such situations, the example assumes a condition where the commercial power source is used at night to charge the high-voltage battery 10 by an amount which is over a charging request, and the high-voltage battery 10 is driven to be discharged to meet the drive request in a time slot just before the departure. Further, information about the bad weather on the departure day can be gained by collecting weather forecast information or others from the outside.

According to the embodiment described above, there can be provided various advantages as follows.

(1) When a power supply process for supplying desired amounts of power to the high-voltage battery 10 and/or electronic devices during a stop of the vehicle, the power supply process during the vehicle stop is planned by using future predicted power cost information such that cost required in actually supplying the desired amounts of power is predicted. This makes it possible to, with consideration of changing power cost, provide the actual timing when the vehicle-stop power supply process is performed, with the timing when the power cost is lower.

(2) The predicted power cost information includes information indicating changes in the power cost supplied from the outside via the plug PG, where the changes are predicted at intervals shorter than one day. It is thus possible to predict or estimate, with higher accuracy, cost and other information about using the commercial power source whose power cost changes even during one day.

(3) The predicted power cost information also includes information indicating power cost required during a period of time from the next run start time instant of a vehicle to a presumed time instant after the run start thereof. This allows the vehicle-stop power supply process to be processed to plan the power supply more reliably and suitably.

(4) The predicted power cost information is used to determine whether or not the power supplied to the on-vehicle electronic devices is fed from the outside via the plug PG or is powered by the high-voltage battery 10. Hence, this determination results in reducing the power cost.

(5) The respective ones of divided unit power amounts Su[,k] of the consumption energy amount and the respective ones of divided unit power amounts Ju[,m] of the charging energy amounts are allocated preferentially to less-cost power amounts among the divided unit power amounts K[i,j] of the predicted available power. This is also helpful to further reduce the power cost (6) Among the consumption energy amounts, consumption energy amounts whose power supply durations to on-vehicle electronic devices are to be designated are given unit power amounts in corresponding periods among the unit power amounts K[i,j], regardless of how the power cost is. This will meet drive demands more suitably.

(7) The cost Cu predicted when the allocation is made to the unit power amount K[x,y] which is set at step S42 is compared with the foregoing charging power cost BCu. This makes it possible to plan the vehicle-stop power supply process such that the power cost can be lowered more.

(8) Since the function of acquiring a charging request for the high-voltage battery 10 is provided, charging the high-voltage battery 10 can be processed appropriately during a stop of the vehicle.

(9) Information showing the priority of charging requests can be inputted from the outside. In this condition, when the sum of both the charging and consumption energy amounts is higher than an predicted available power amount, the type of power to be supplied to the high-voltage battery 10 is decided based on the priority. Hence, it is possible to meet to user's requests sufficiently.

(10) In addition, there is provided a function of acquiring drive requests for on-vehicle electronic devices during a period of time until the vehicle's next run start. Hence, this also makes it possible to treat drive process for the on-vehicle electronic devices timely and reliably.

(11) Information showing the priority of drive requests for electronic devices can be inputted from the outside. In this condition, when the sum of both the charging and consumption energy amounts is higher than an predicted available power amount, the type of power to be supplied to the electronic devices is decided based on the priority. Hence, it is possible to meet to user's requests more sufficiently.

(12) When the sum of both the charging energy amount and the consumption energy amount is higher than the predicted available power amount, a notice that the sum of the charging and consumption energy amounts is limited is issued to a user. By this notice, the user can know that the user's demand cannot be met.

(Second Embodiment)

Figure 8:
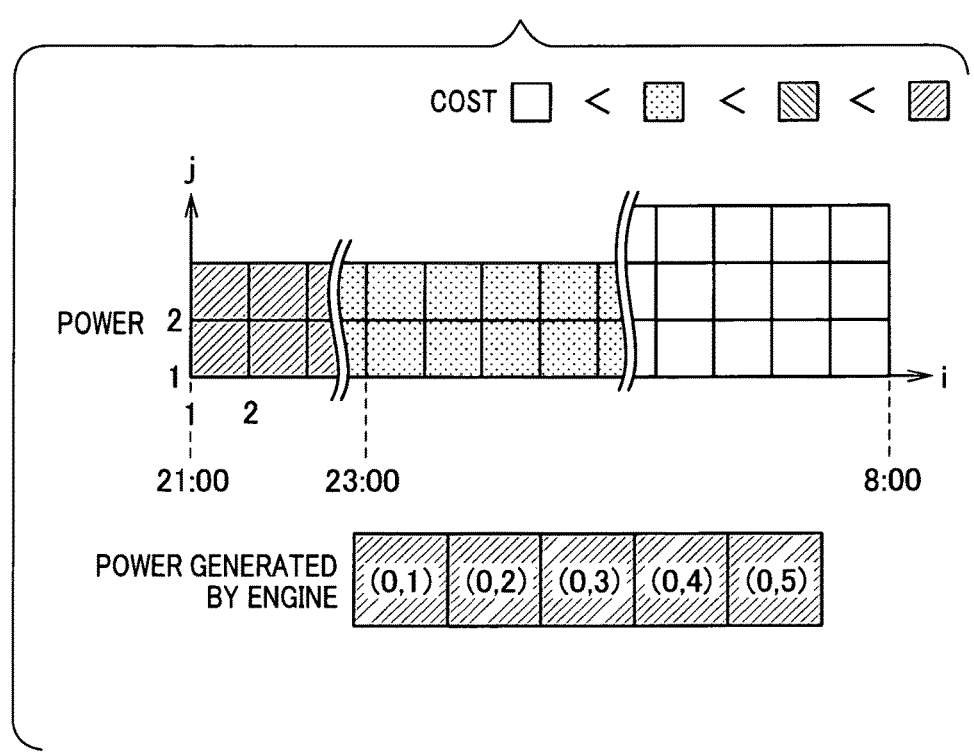
FIG. 8 is a diagram showing an example of a decision process performed in the second embodiment.

Referring to FIG. 8, a second embodiment of the power control apparatus for vehicles according to the present invention will now be described. In the second embodiment and subsequent embodiments, the same or identical components as or to those described in the first embodiment will be given the same reference numerals for the sake of simplifying redundant explanations. That is, the explanation will focus on different matters from the first embodiment.

Figure 7:
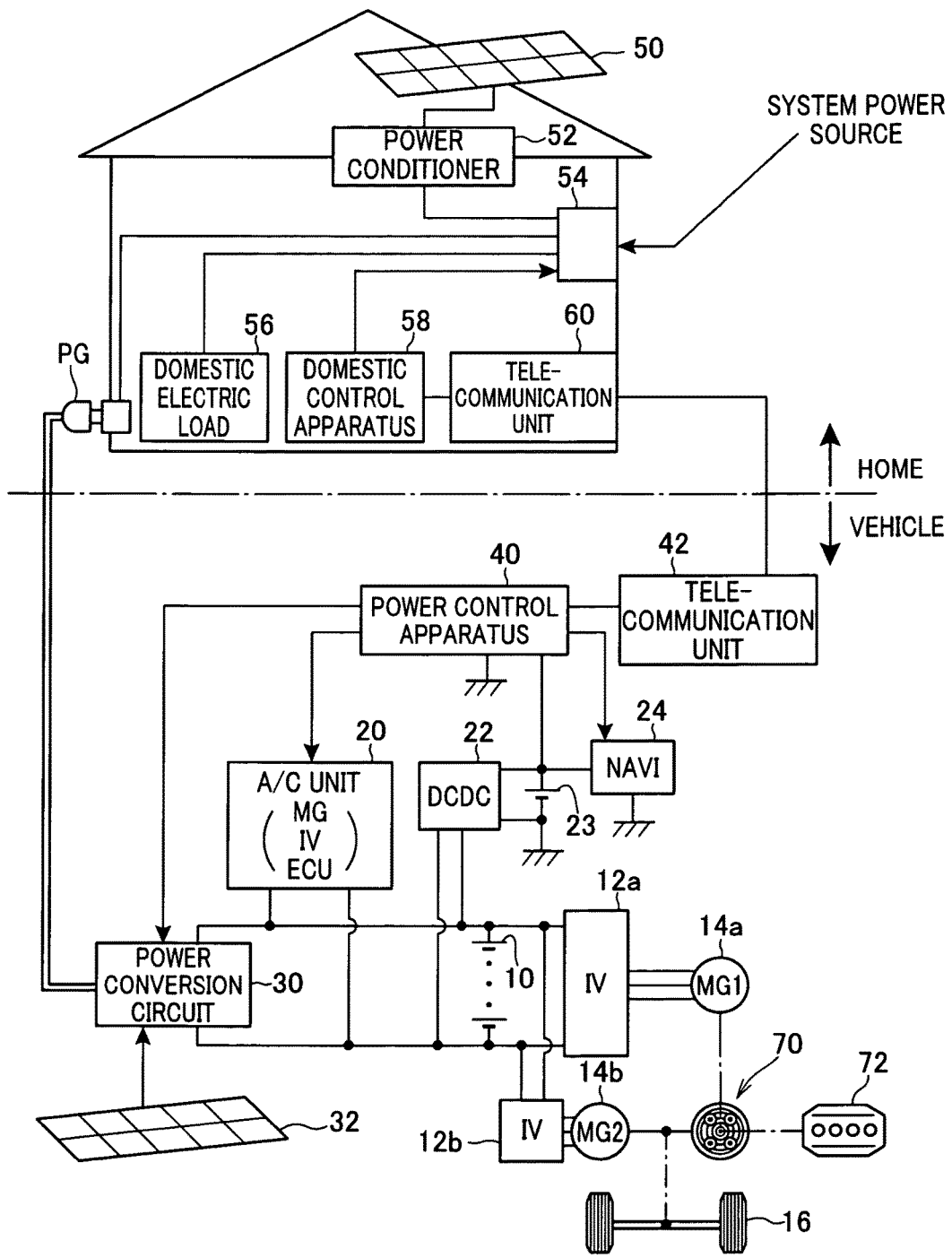
FIG. 7 is a diagram showing the configuration of a system according to a second embodiment of a power control apparatus according to the present invention.

In the present embodiment, the power control apparatus for vehicles according to the present invention is applied to parallel-series hybrid vehicles. FIG. 7 shows the system configuration of the apparatus according to the present embodiment. In FIG. 7, the members which are identical to those shown in FIG. 1 are given the same reference numerals for the sake of a simplified explanation. In the configuration shown, a power dividing mechanism 70 consisting of a planetary gear mechanism is arranged to divide power from a first motor generator 14a, a second motor generator 14b, and an internal combustion engine (engine 72). Practically, the first motor generator 14a, the engine 72, and the second motor generator 14b are mechanically linked with the sun gear, carrier, and ring gear of the power dividing mechanism 70, respectively. In addition, with the second motor generator 14b, driving wheels are mechanically linked. With the first and second motor generator 14a and 14b, a first inverter 12a and a second inverter 12b are eclectically connected, respectively.

According to the above configuration, in a stopped state of the vehicle whose driving wheels are stopped from rotating, the first motor generator 14a and the engine 72 can be operated. Hence, as the power supply process while the vehicle is stopped, there is provided an additional option of making the engine 72 operate to supply power generated by the first motor generator 14a. Thus, in the present embodiment, this option will now be explained concerning its possibility for use in planning the power supply process in the vehicle stop.

FIG. 8 shows the unit power amounts K[i,j] divided by the processing at step S40 in FIG. 4 of the foregoing embodiment. In the present embodiment, in addition to the power shown in FIG. 5(a), the power generated by the engine 72 is added to the unit power amounts K[i,j]. It should be noted however that the power generated by the engine 72 has no definition for the time slot. Hence, in the present embodiment, as the $1^{st}$ column address i to define the time slot, an address which is not allocated to a period of time from the current time instant to the departure time instant (in the present embodiment, "0" by way of example) is added. The costs of the unit power amount K[0,j] obtained from division of an energy amount generated by the engine are set to be the same unit as those other than the power cost by, for example, quantifying the power cost into currency or amounts directly proportional to the currency.

By the above setting, the unit power amounts K[0,j] can be studied at any of foregoing steps S42 and S44 shown in FIG. 4. For example, at step S42, when the unit power amounts K[0,j] are lower than the power cost in the time slot of which drive time is defined, the allocation is made to this unit time amounts. Alternatively, at step S44, the residual unit power amounts K[i,j] (i=1, 2, . . . ) and the unit power amounts [0,j] are subjected to comparison to select smaller cost to be prioritized.

According to the present embodiment described above, the following embodiment can be obtained additionally to the various advantages described in the first embodiment.

(13) Whether the power supplied from the outside via the plug PG should be used or the rotation energy of the engine 72 should be used can be determined based on the predicted power cost information. This makes it possible to further reduce cost necessary for power supply during a vehicle stop.

(Third Embodiment)

Figure 9:
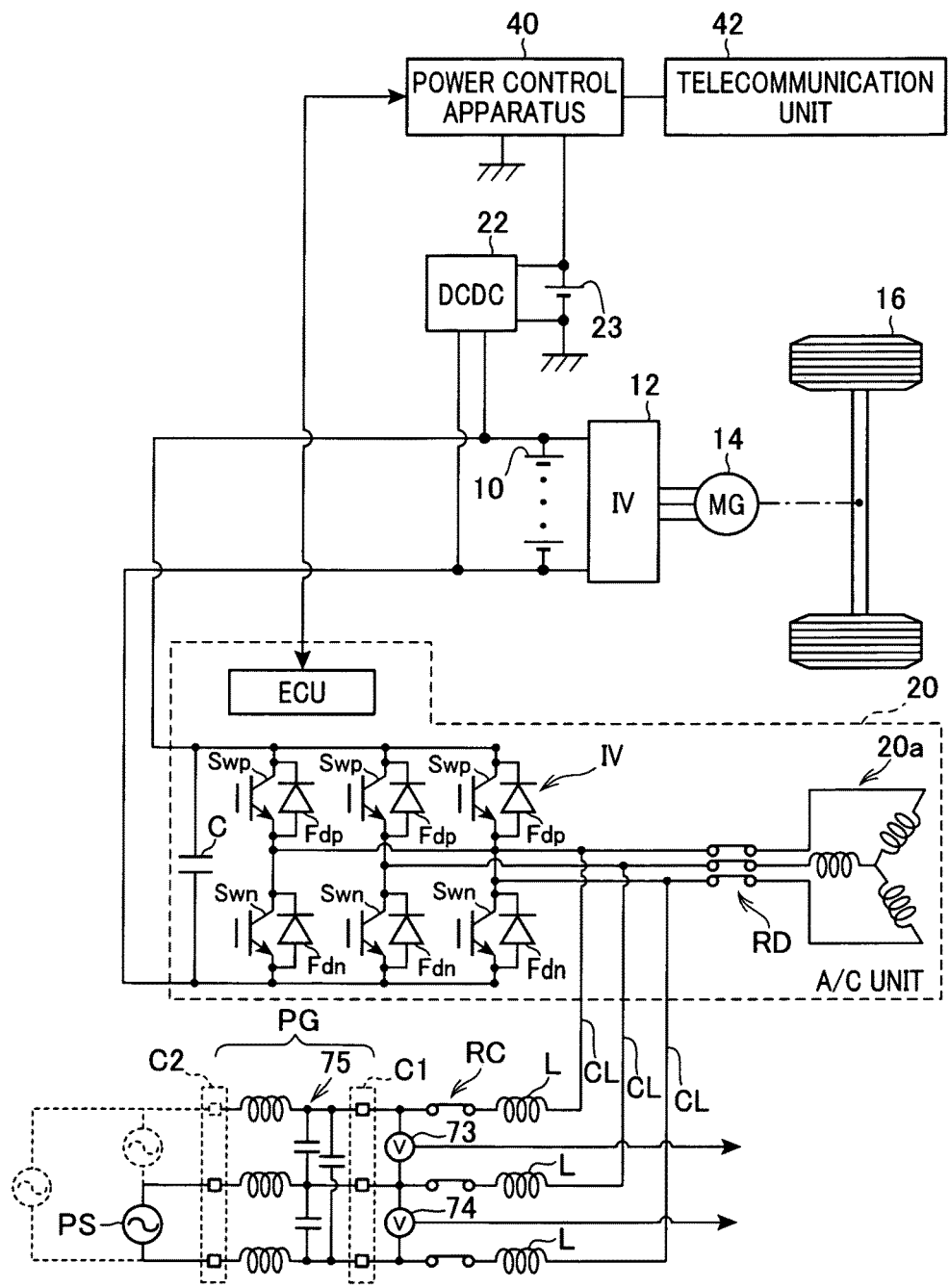
FIG. 9 is a diagram showing the configuration of a system according to a third embodiment of a power control apparatus according to the present invention.
Figure 10:
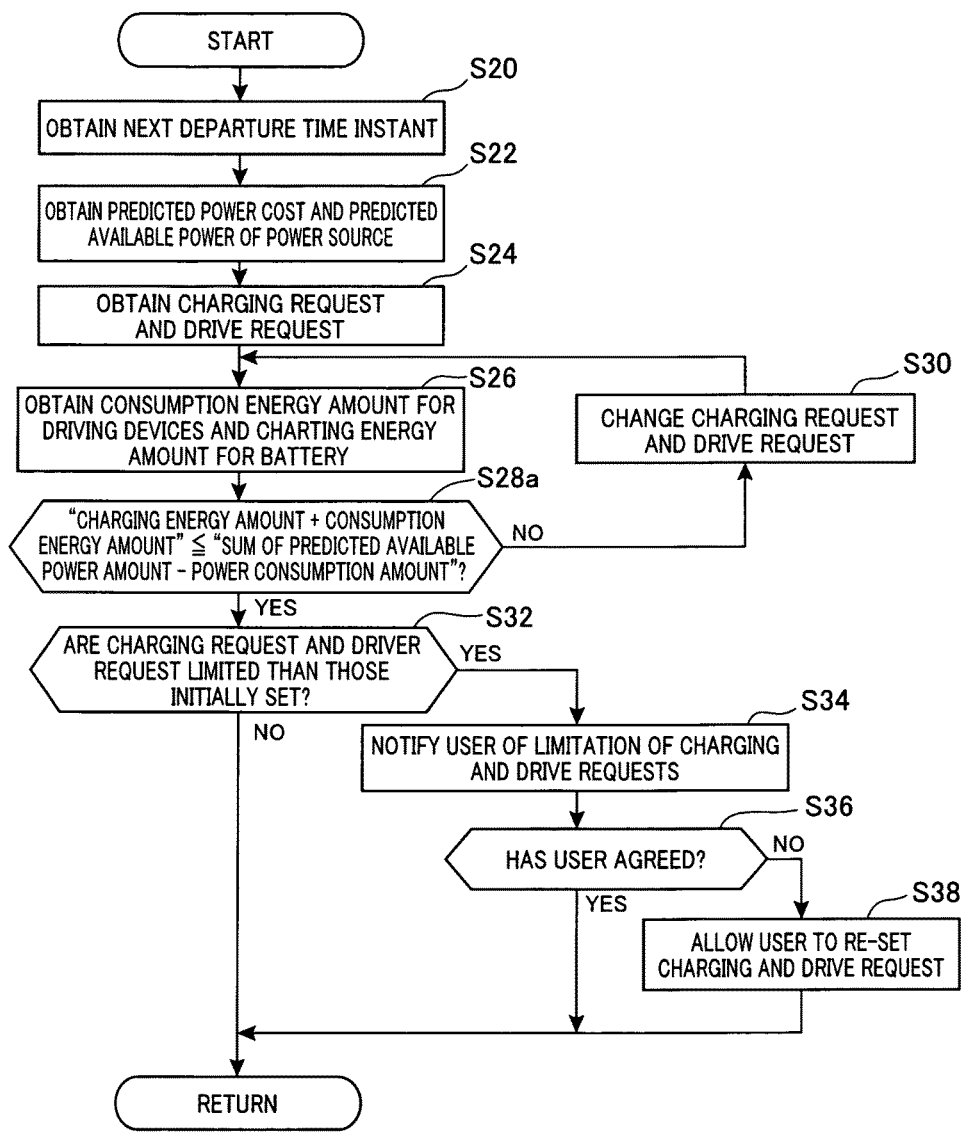
FIG. 10 is a flowchart showing the steps of a prediction process for a request performed in the third embodiment.
Figure 11:
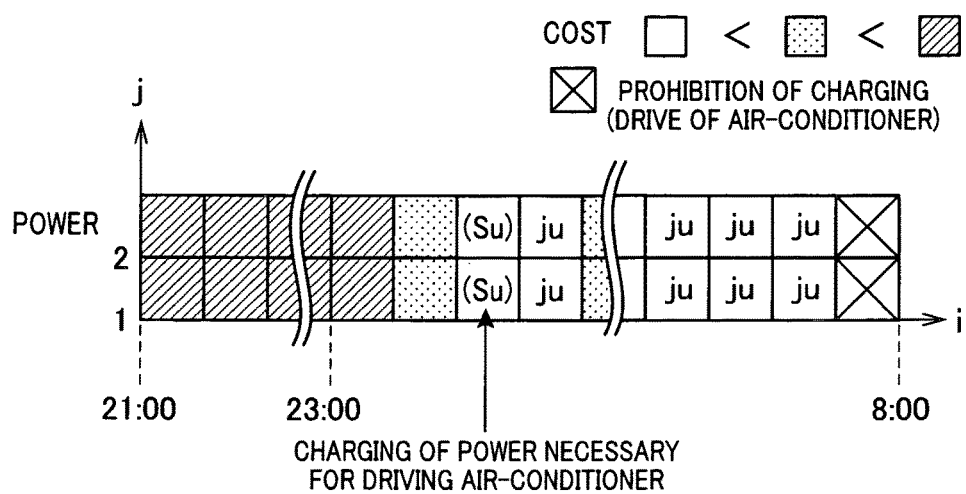
FIG. 11 is a diagram showing an example of a decision process performed in the third embodiment.

Referring to FIGS. 9 to 11, a second embodiment of the power control apparatus for vehicles according to the present invention will now be described. The explanation will mainly focus on different matters from the first embodiment.

FIG. 9 shows the configuration of an in-vehicle system according to the present embodiment. In FIG. 9, components corresponding to those shown in FIG. 1 are given the same reference numbers for the sake of a simplified explanation.

Differently from the system in the first embodiment, the present system is not provided with the power conversion circuit 30 dedicated to charge the high-voltage battery 10 with power supplied through the plug PG. Instead, the present system functionally borrows an inverter IV installed in the air-conditioning unit 20, as an alternative for the power conversion circuit to charge the high-voltage battery 10.

The inverter IV is provided with three sets of serially connected electrical members each consisting of a high-potential side switching element Swp and a low-potential side switching element Swn. To the high-potential side switching element Swp, a free-wheel diode Fdp is electrically connected in antiparallel with the switching element Swp, and to the low-potential side switching element Swn, a free-wheel diode Fdn is electrically connected in antiparallel with the switching element Swn. In FIG. 9, the switching elements Swp and Swn are insulated gate bipolar transistors (IGBT), for instance.

The foregoing inverter IV has output terminals each of which is electrically connected, via power sending/receiving electric paths CL, with a sending/receiving port (connector C1) for electrical connection with the outside of a vehicle. This connector C1 is connectable with one end of the plug PG. The other end of the plug PG is electrically connected with a sensing/receiving port (connector C2) for electrical connection between the outside of the vehicle and the residential power source PS serving as power supplies such as commercial power source. The plug PG is provided with a filter 75. In the present embodiment, the filter 75 can be exemplified by an LC circuit. In FIG. 9, as the power source PS, a single-phase power source is used. Meanwhile the vehicle according the present embodiment is designed to be applicable to a three-phase power source shown by dashed lines, so that three terminals are given in the connector C1.

Between the respective connection points between the output terminals of the inverter IV and the power sending/receiving electric paths CL and a motor generator 20a provided in the air-conditioning unit 20, a relay RD for auxiliary devices is arranged to electrically open and close therebetween. In each of the power sending/receiving electric paths CL, there are arranged a relay RC for opening and closing each path to send and receive power and a charging reactor L storing energy therein. The relay RD for auxiliary devices becomes active to prevent current from flowing to the motor generator 20a when power is transmitted between an external power supply and the vehicle. The relay RC is arranged to prevent an electrical connection between an external power supply and the inverter in cases where the inverter IV is not prepared for sending and receiving power to and from the external power supply. For such purposes, the power control apparatus 40 commands both the relays RC and RD to be opened and closed selectively with a proper scheme.

Between one of the three output terminals of the connector C1 and the residual two output terminals thereof, there are provided voltage sensors 73 and 74 detecting differences in potential between those terminals. The power control apparatus 40 controls charging the high-voltage battery 10 with power supplied from the power source PS, based on various factors such as outputs of the voltage sensors 73 and 74.

The photovoltaic generation panel 32 is not used in the present embodiment. Furthermore, for the sake of a simplified explanation, the navigation system 24 is also omitted from the drawing and explanation.

In the foregoing system, when the power supplied via the plug PG is used to charge the high-voltage battery 10, the motor generator 20a cannot be driven. Meanwhile when it is desired to drive the motor generator 20a, the power supplied via the plug PG cannot be used to charge the high-voltage battery 10. Therefore, planning the power supply process will be changed as follows in the present embodiment.

FIG. 10 shows the steps of a process predicting whether or not it is possible to meet to such requests as a charging request and a drive request in the resent embodiment. This process is performed by the power control apparatus 40 in response to, for example, a trigger showing completion of the foregoing process shown in FIG. 2. In FIG. 10, the steps corresponding to those shown in FIG. 3 are given the same step numbers as those for simplifying the explanation.

In a series of steps in FIG. 10, when the processing at step is completed, the processing proceeds to step S28a, where it is determined whether or not a sum of the charging and consumption energy amounts is equal to or less than an amount obtained by subtracting the consumption energy amount from the sum of the predicted available power amounts. This processing is for determining if or not the charging or drive request can be met. In other words, in the present embodiment, while the energy required for the air-conditioning unit 20 cannot be supplied directly from the plug PG, the energy stored in the high-voltage battery 10 is consumed by the air-conditioning unit 20. Hence, it is necessary that the consumed energy amount should be given as compensation to the high-voltage battery 10 during its charging time. Meanwhile when the power supply via the plug PG is always available, the sum of the predicted available power amounts covers an amount of power which can be supplied during drive of the air-conditioning unit 20. Hence, such an amount of power which can be supplied during the drive of the air-conditioning unit 20 is actually not possible to be supplied. Accordingly, in the present embodiment, the determination that the sum of the charging and consumption energy amounts is equal to or less than the amount obtained by subtracting the consumption energy amount from the sum of the predicted available power amounts is used in place of a determination that it is possible to meet all the requests. In this step, it is assumed that the power consumed by the air-conditioning unit 20 equals the power available via the plug PG. If this assumption is not fulfilled, a reference power amount which is a basis for meeting all the requests becomes different from the foregoing subtracted power amount. That is, for example, the amount of power consumed by the air-conditioning unit 20 is smaller than the amount of power available via the plug PG, the reference power amount for all the requests becomes smaller than the subtracted power amount.

FIG. 11 exemplifies planning of the power supply process according to the present embodiment.

As shown, in the present embodiment, the period of time during which the air-conditioning unit 20 is driven is given as a charging-prohibited period, and both the charging power (the unit power amounts Ju[ ,m] and the unit power amounts Su[ , k] consumed by driving the air-conditioning unit 20 are allocated to the unit power amounts K[i,j] in the residual period of time other than the charging-prohibited period.

According to the present embodiment described above, the following effect can be obtained in addition to those explained in the first embodiment.

(14) The drive period of the air-conditioning unit 20 is given as the charging-prohibited period. This allows the power available via the plug PG to cover both the charging and consumption energy amounts.

(Fourth Embodiment)

Figure 12:
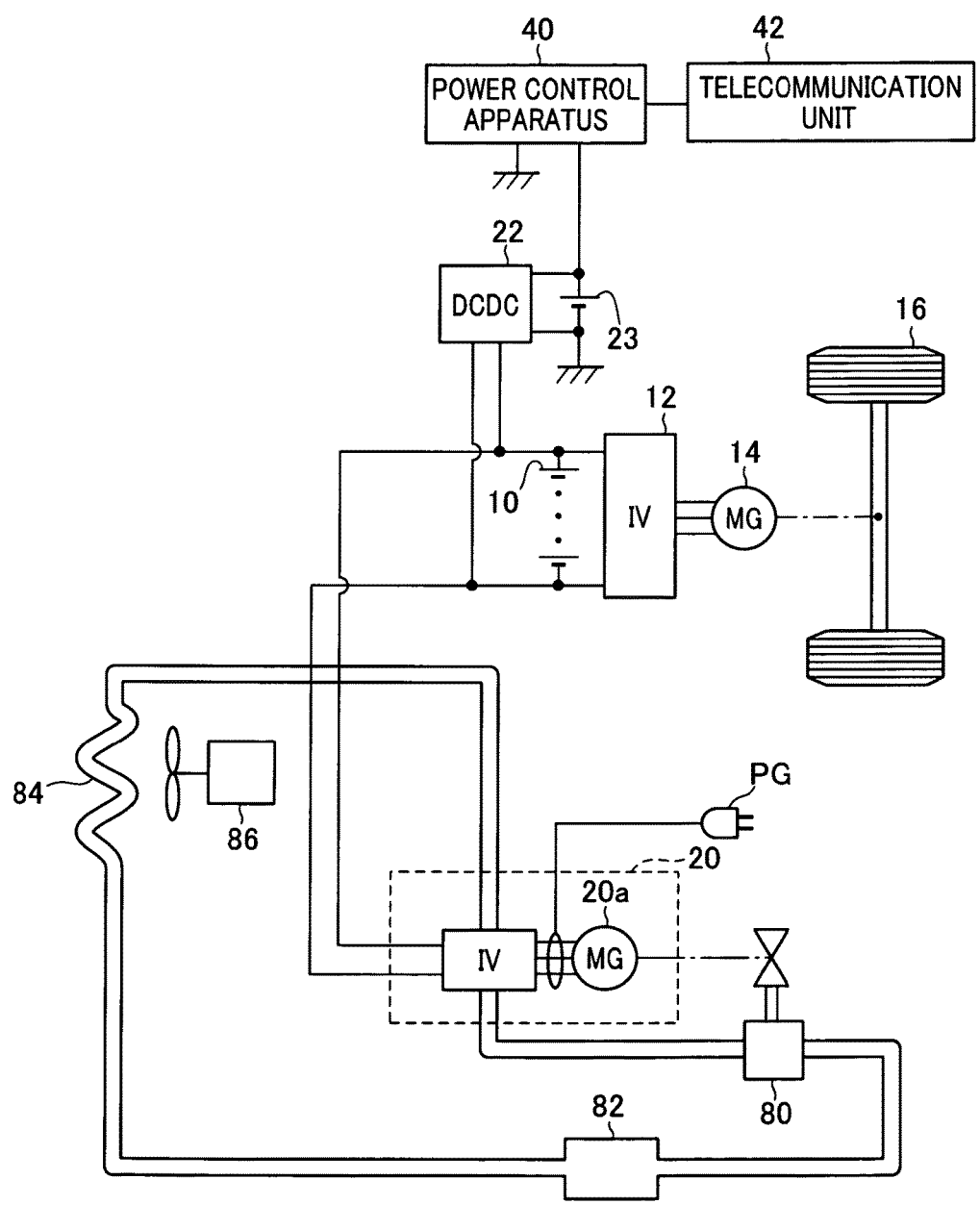
FIG. 12 is a diagram showing the configuration of a system according to a fourth embodiment of a power control apparatus according to the present invention.
Figure 13:
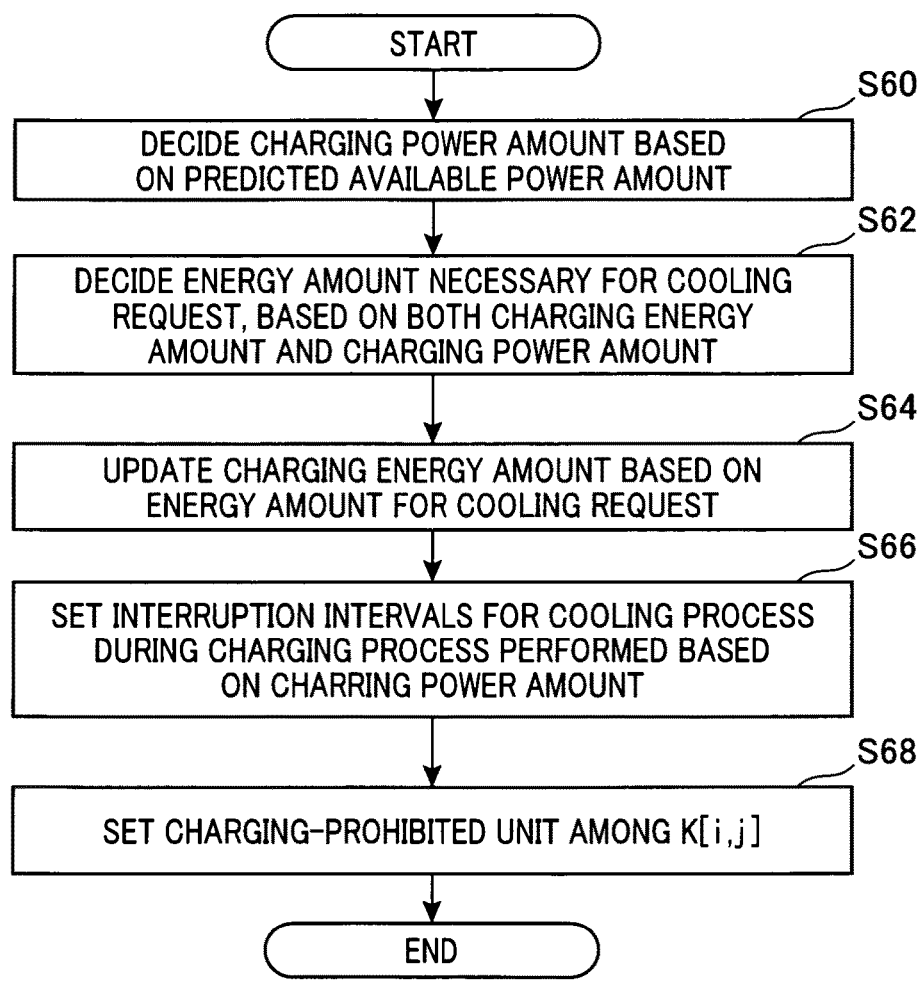
FIG. 13 is a flowchart detailing part of the steps of a decision process performed in the fourth embodiment.
Figure 14:
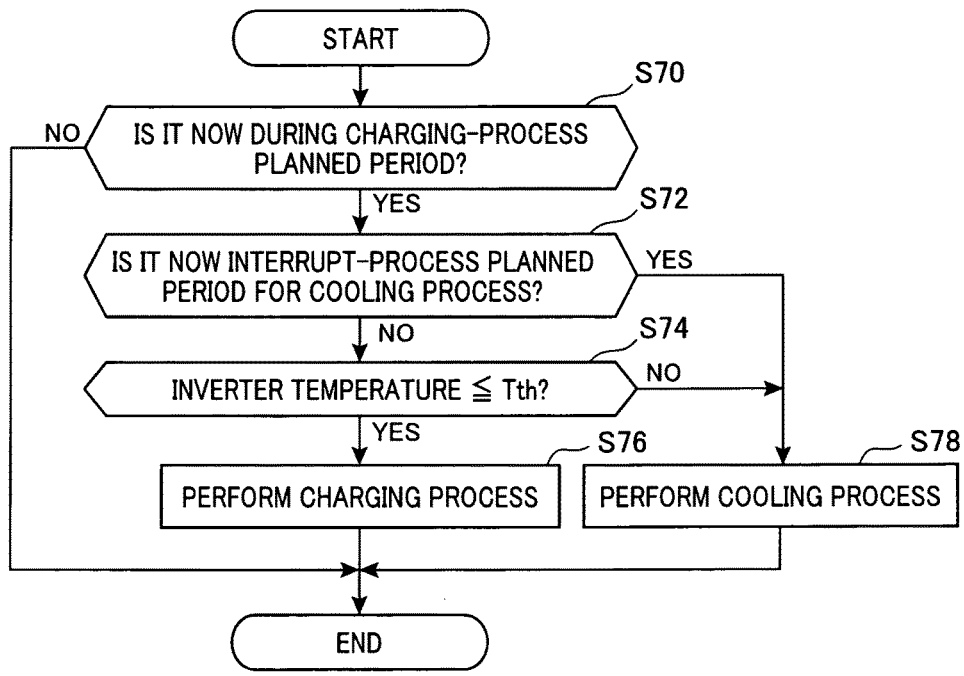
FIG. 14 is a flowchart detailing part of the steps of a power supply process performed during a vehicle's stop in the fourth embodiment.

Referring to FIGS. 12 to 14, a third embodiment of the power control apparatus for vehicles according to the present invention will now be described. The explanation will mainly focus on different matters from the third embodiment.

FIG. 12 shows the configuration of an in-vehicle system according to the present embodiment. In FIG. 12, components corresponding to those shown in FIG. 9 are given the same reference numbers for the sake of a simplified explanation.

As shown, in the present embodiment, the inverter IV is cooled by the refrigerant gas of the air-conditioning unit. Practically, the motor generator 20a of the air-conditioning unit 20 is mechanically linked with a compressor 80. The refrigerant gas discharged from the compressor 80 is first compressed by a condenser 82, and then expanded by an evaporator 84, where its vaporization heat cools surrounding air when being expanded. The cooled air is sent to a vehicle interior by a blower fan 86. The inverter IV is arranged in an inlet port or thereabouts of the compressor 80 in a path through which the refrigerant gas flows, such that the inverter IV can be cooled down. This arrangement gives first priority to the original purpose of cooling down the vehicle interior. In other words, the arrangement position is downstream than the position of the evaporator 84 and also upstream than the compressor 80, whereby the inverter IV can be cooled down by the evaporator 84, using the refrigerant gas which has cooled down the gas for cooling the vehicle interior.

By the way, by making the inverter IV charge the high-voltage battery 10 with power supplied via the plug PG, the inverter IV heats up. If the temperature of the inverter IV increases excessively, which is due to the heating up, reliability of the inverter IV may decrease. This situation may not be caused during driving the air-conditioning unit 20, because the inverter IV is cooled down by the refrigerant gas. In order to solve such an inconvenience that the inverter IV is used for the charging process, the present invention allows the air-conditioning unit 20 to be driven during the charging process period, whereby a cooling process for cooling down the inverter IV can be interrupted.

FIG. 13 shows the steps of a process for planning the interrupt of the cooling process.

This cooling process is performed by the power control process 40 prior to the performance of the process shown in FIG. 4, for instance.

In the steps of this process, firstly at step S60, an amount of charging power is estimated based on an amount of predicted available power. This estimation considers that the upper limit value of the charging power changes depending on power available through the plug PG. For example, in Japan, when it is assumed a single phase power source is connected to the connector C1, the predicted available power is "1500 W" or "3000 W," depending on whether the effective value of voltage applied to the connector C1 is "100 V" or "200 V", respectively. When a three-phase power source is applied, the predicted available power is a specified value of "1500 W" or higher (preferably, "3000 W" or higher), although such predicted available power changes in response to settings of the external power source.

At subsequent step S62, a charging energy amount and a charging power amount are used to decide an amount of energy (a cooling-request energy amount) required to drive the air-conditioning unit 20 for cooling down the inverter IV. The charging energy amount is a parameter having a positive correlation with an amount of heat from the inverter IV, which is due to the charging process. In other words, it is assumed that the larger the charging energy amount, the larger the heating amount of the inverter IV. Hence, the cooling-request energy amount is set to be larger as the charging energy amount increases. Further, the charging power is a parameter having a positive correlation with the mount of heat per unit time from the inverter IV. Thus it is estimated that an increase in the temperature of the inverter IV or other quantities change based on the charging power. With this estimation, the cooling-request energy amount is variably set depending on the amount of the charging power. This step may be performed using a model in which the inverter IV is modeled as an object for temperature control, or may a map which regulates relationships between each of the charging energy amount and charging power and the cooling-request energy amount.

At subsequent step S64, the cooling-request energy amount is used to update the amount of the charging energy with which the high-voltage battery 10 is charged. Precisely, when the air-conditioning unit 20 is driven during the charging period, the energy stored in the high-voltage battery 10 is consumed. Hence, to increase the amount of electricity in the high-voltage battery 10 by an amount of charging energy defined by the process shown in FIG. 2, it is necessary to charge the battery with an amount of energy higher than the charging energy amount by the cooling-request energy amount.

At subsequent step S66, the charging power amount is used to set interrupt intervals during the charging process, in which the cooling process is performed every interrupt interval. The interrupt intervals are set to be interrupt timing, based on the charging power amount, at which it is estimated that the temperature of the inverter IV reaches an allowed upper limit. The interrupt intervals become shorter as the charging power amount becomes larger. Then at step S68, among the unit power amounts K[i,j] available via the plug PG, a charging-prohibited unit is set. This processing has already been described with FIG. 11. When step 68 is completed, the processing is ended for this cycle.

FIG. 14 shows the steps of the charging process for the high-voltage battery 10, which is intended to particularly explain the power supply processes performed in the present invention. This process is repeatedly performed by the power control apparatus 40 at predetermined intervals of time, for instance.

In the steps of this charging process, firstly at step S70, it is determined whether or not it is now during a charging-process planned period planned by the steps shown in FIG. 4. If the determination at step S70 is affirmative, the processing proceeds to step S72 to further determine whether or not it is now in an interrupt-process planned period for the cooling process. This interrupt-process planned period is defined as a period of time starting from a time instant at which the charging process for a previously planned period of time defined by step S66 in FIG. 13 is completed, to a time instant at which a period of time estimated to need for cooling down the inverter IV passes. When the determination at step S74 is negative, it is further determined at step S74 whether or not the temperature of the inverter IV is equal to or lower than a threshold temperature Tth. This step is for treating a situation where an increase in the temperature of the inverter IV is larger than the prediction, in contradiction to the planning described with FIG. 13. The threshold temperature Tth is set to be equal to or lower than an upper limit temperature that still maintains operational reliability of the inverter IV. If it is determined affirmatively at step S74, the processing proceeds to step S76 to perform the charging process. In contrast, if it is determined affirmatively at step S72 or it is determined negatively at step S74, step S78 is subjected to processing by which the motor generator 20*a* is driven to cool down the internal inverter IV.

In addition, when a negative determination is made at step S70 or the processing at step S76 or S78 is completed, the process of these steps is ended for this cycle.

According to the present embodiment described above, in addition to the foregoing advantages described in the third embodiment, the following advantages can be obtained.

(15) The interrupt planning is made for a process (cooling process) to decrease the temperature of the internal inverter IV using the refrigeration cycle of the air-conditioning unit 20. It is thus preferable to prevent the temperature of the inverter IV from increasing excessively due to the charging.

(16) The amount of charging energy of the high-voltage battery 10 is updated so as to compensate for energy consumed by driving the air-conditioning unit 20. As a result, it is possible to control, with precision, an increased amount of energy stored in the high-voltage battery 10 according to a charging request.

(17) When the temperature of the inverter IV exceeds a threshold temperature in performing the charging process for the high-voltage battery 10, the cooling process for the inverter IV interrupted into the original plan by driving the motor generator 20*a* however the original pan is. This allows the interrupt to properly cope with a situation where there is a gap between the amounts in the original plan and those in actual operations and an increase in the temperature of the inverter IV is larger than expected.

(Fifth Embodiment)

Figure 15:
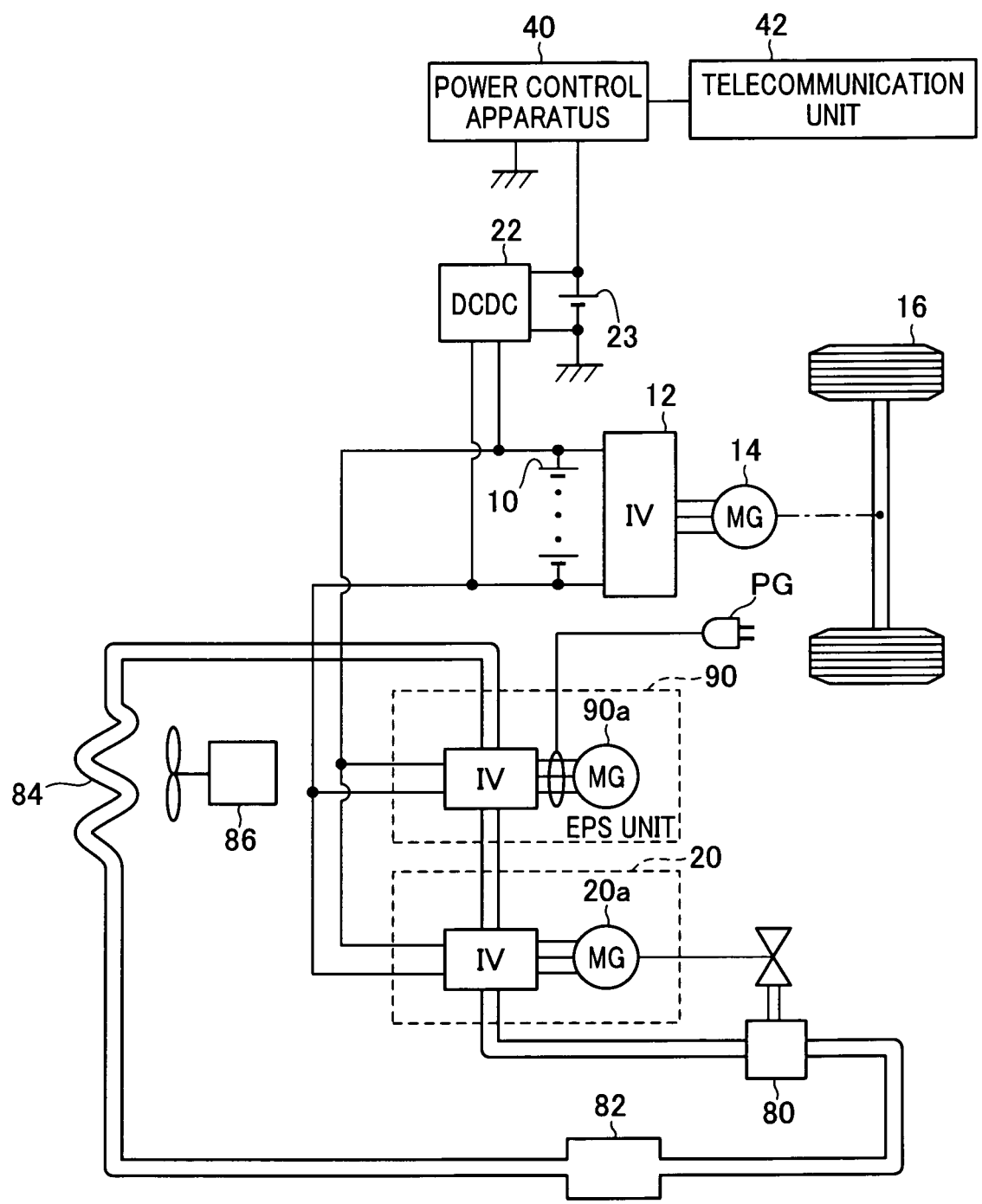
FIG. 15 is a diagram showing the configuration of a system according to a fifth embodiment of a power control apparatus according to the present invention.

Referring to FIG. 15, a fifth embodiment of the power control apparatus for vehicles according to the present invention will now be described. The explanation will mainly focus on different matters from the third embodiment.

FIG. 15 shows the configuration of an in-vehicle system according to the present embodiment. In FIG. 15, components corresponding to those shown in FIG. 9 are given the same reference numbers for the sake of a simplified explanation.

As shown, in the present embodiment, the system is provided with a motor generator 90*a* mounted in a power steering system to assist the vehicle steering and a power steering unit 90 provided with an inverter IV electrically connected to that motor generator. The high-voltage battery 10 is designed as a power source that powers both the motor generator 90*a* and the power steering unit 90. The inverter IV incorporated in the power steering unit 90 is functionally borrowed as means for charging the high-voltage battery 10 with power supplied via the plug PG. This inverter IV is cooled down by the refrigerant gas flowing in response to drive of the air-conditioning unit 20. In this case, during a period of time for charging the high-voltage battery 10 with the power supplied via the plug PG, the air-conditioning unit 20 can be drive to circulate the refrigerant gas without stopping the charging process. Incidentally, even in this case, it is still preferable to update the charging energy amount of the high-voltage battery 10 depending on the cooling-request energy amount.

(Other Embodiments)

The foregoing embodiments can still be modified as follows.

<Concerning Charging Request Acquiring Means and Drive Request Acquiring Means>

Charging request acquiring means and drive request acquiring means may not be limited to means for acquiring requests given by users. Alternatively, for example, learning means may be provided to learn a charging request and/or a drive request by learning a user's tendency of utilizing a vehicle and the charging request acquiring means and the drive request acquiring means may be configured to estimate, as a request in a period continuing until the next departure, a request learned by this learning means. Practically, for example, an assumption can be made such that a vehicle starts to run at 8:00 in the morning on week days, an instruction is issued which instructs the air-conditioning unit 20 to maintain a predetermined vehicle-interior temperature, and the vehicle is driven to run for a predetermined distance before stopping in the evening. The learning means learns such a tendency. In this case, a request to be predicted (or estimated) is that, every night from Monday through Friday, the battery should be charged sufficiently for a round trip of the predetermined distance by the next departure-scheduled time of "8:00 a.m." and the temperature in the vehicle interior should be at a learned temperature at the departure time. Incidentally because a request to be learned has regularity but still fluctuates slightly, it is preferred in estimating a request to employ a request which is redundant among the fluctuations of a request. In other words, if it is learned that the departure time is within a range of before and after 5 minutes to and after 8:00 in the morning on week days, it is preferable to estimate a request that the departure time is 7:55 in the morning.

<Concerning Future Predicted Power Cost Information>

The future predicted power cost information will not be limited to power cost necessary in a duration from the current time instant to the next run start time instant of a vehicle to be predicted. For example, a run duration to be predicted for the next time may be included in such information. For example, when a down slope continues for a while after starting the run from a starting point to a target point, the power cost for charging the battery becomes zero, because rotation energy can be obtained from the driving wheels in this period for running down the slope. Hence, if such a condition is found previously, this may be included in the predicted power cost information. Such a means is particularly effective when, as designation of the charging request, a run distance or similar information thereto is designated, instead of directly designating the residual capacity of the battery.

Furthermore, the predicted power cost information will not also be limited to power cost information necessary for an overall duration from the current time instant to the vehicle's run start time instant predicted for the next time. For example, in such a situation where without receiving charging requests for the battery and receiving a designated time instant at which an electronic device is requested to be driven, but a stop duration of the vehicle is bridged over plural days, it is assumed that electronic devices are to be driven within a duration from a vehicle run start time instant to be predicted to a time instant which has passed 24 hours since the start time instant. In this example, based on this assumption, the power supply plan for a vehicle stop is performed based on only the predicted power cost information acquired within such 24-hour duration.

<Concerning On-Vehicle Electronic Devices>

The on-vehicle electronic devices may not be limited to the air-conditioning unit 20 and the navigation system 24. Alternatively, audio and/or video devices are also adopted. In such a case where a user stays in the vehicle over a night, a request to activate the audio and/or video devices instead of using an alarm clock may be issued. In such a case, the power supply process for a vehicle stop according to the present invention can be employed to determine whether the external power for such devices should be obtained via the plug PG or the power of the on-vehicle battery 10 or others should be used.

<Concerning Applications of Power Conversion Circuit Also Usable For Charging>

Such applications are not limited to the inverters in the power steering unit 90 and air-conditioning unit 20. For example, in a vehicle provided with an engine, such applications include an application to an inverter for cooling fans which cools down cooling water or others. In this case, when the inverter is arranged in the flowing direction of air generated by the cooling fans in response to drive the inverter, the same process described in the fourth embodiment can be true of this modification, while still being advantageous.

<Concerning a Device to Cool Down the Charging Means>

Such a device will not be confined to the air-conditioning device. As long as something consumes electric energy of the secondary battery, it is still advantageous to perform the charging plan so as to compensate for the energy consumed by such means.

<Concerning Interruption of Process to Decrease Temperature>

In the foregoing fourth embodiment, the cooling process is basically made to be interrupted according to a previously planned power supply process, but this is not only a solution. By way of example, such interruption may be performed only if the inverter temperature is over the threshold temperature Tth. Even in this case, the cooling-request energy amount is set previously to update the charging energy amount. This makes it possible that a duration required to charge the high-voltage battery 10 and the amount of energy taken in from the commercial power source can be predicted accurately to plan the power supply process. Further, in a duration in which the amount of power taken in via the plug PG becomes zero due to the cooling process, there may be a plan to increase the amount of power consumption other than consumption of power obtained via the plug PG in the house. Even in such a case, the original plan should be kept on the vehicle side, still providing a merit described.

<Concerning Cooling Mechanism of Power Conversion Circuit>

Instead of using the configuration shown in FIG. 12, it is also possible to arrange the inverter IV at a position which is downstream position to the compressor 82 but upstream to the evaporator 84. How to cool down the power conversion circuit is not confined to water cooling, which is described in the foregoing <Concerning applications of power conversion circuit also usable for charging>.

<Others>

The power supply process for a vehicle stop possibly include only the charging process of the battery.

The hybrid vehicle will be limited to parallel hybrid vehicles and parallel-series hybrid vehicles. For example, series hybrid vehicles may be adopted. In this type of vehicle, driving wheels cannot rotate by the internal combustion engine, so that the process identical to that in the second embodiment can be performed.

The battery to which the charging request is issued is not limited to the high-voltage battery 10, but can be issued to the low-voltage battery 23 for example. In such a case, the low-voltage battery 23 can be charged through the charging process for the high-voltage battery 10 and a process to output the power stored in the high-voltage battery 10 to the low-voltage battery 23 via the DCDC converter 22.

What is claimed is:

1. A power control system being mounted in a vehicle, the power control system comprising:
   a receiving port configured to be electrically connected to an external power supply device placed outside the vehicle;
   a secondary battery provided in the vehicle and configured to store therein power supplied from the external power supply device via the receiving port;
   a power supply device provided in the vehicle and configured to supply power to on-vehicle electric loads that consume power supplied; and
   a controller provided in the vehicle and configured to:
      acquire information indicative of future power cost information predicted currently, the future power cost information including information indicative of power cost in a duration of time from a current time instant at which the vehicle is stopped to a time instant at which the vehicle is predicted to start next;
      obtain i) an available power amount which is predicted as being available via the receiving port, and ii) both an amount of power consumed by the on-vehicle electric loads and an amount of charging power required to charge the secondary battery; and
      plan a power supply process performed during the duration of time, the power supply process including a process of: i) supplying the electric loads with the consumed amount of power required during the duration of time; and ii) supplying the secondary battery with the required charging amount of power, the power supply process being planned based on a prediction calculated based on both the future power cost information and the obtained amounts of consumed power and required charging power,
   wherein, in planning the power supply process, the controller is configured to:
      (i) divide each of the predicted available power amount, the amount of consumed power, and the amount of required charging power into a set of unit power amounts with two-dimensional addresses, a one-dimensional address of the two-dimensional addresses showing time slots provided by dividing the duration of time by a predetermined period of time, wherein
      the other dimensional addresses of the set of unit power amounts of the predicated available power amount show an available power amount in each of the time slots, the unit power amounts accompanying cost information based on the future power cost information, and
      the one-dimensional addresses of both the set of the amount of consumed power and the set of the amount of required charging power are set to be blanked except for designated time slots corresponding to a drive time of the on-vehicle electric loads;
      (ii) first allocate, of the unit power amounts divided from the consumed amount of power, every time slot, the unit power amounts residing in the time slots assigned to the drive time, to the corresponding unit power amounts of the predicted available power amount;
      (iii) second allocate, to the remaining unit power amounts of the predicted available power amount, every time slot, the unit power amounts of the consumed amount of power and the unit power amounts of the required charging amount of power such that the remaining unit power amounts of the predicted available power amount are subjected to the allocation in an ascending order of power cost shown by the cost information accompanied by the unit power amounts of the predicted available power amount, the ascending order starting from lower cost of the power to higher cost of the power; and (iv) activate the power supply device based on the planned power supply process such that the power supply process is performed.

2. The power control system according to claim 1, wherein the controller is configured to estimate the future power cost that includes information indicative of fluctuations in cost of power supplied via the receiving port, the fluctuations being at intervals shorter than one day.

3. The power control system according to claim 1, wherein the vehicle is provided with both an internal combustion engine and a converter for converting rotation energy generated by the engine to electric energy, and the controller is configured to decide, based on the future power cost information, whether the power to be supplied via the receiving port should be used as the power to be supplied to the on-vehicle electric devices or the rotation energy from the engine, which is converted by the converter, should be used as the power to be supplied to the electric loads.

4. The power control system according to claim 1, wherein the on-vehicle electric devices include a temperature reducing device for reducing a temperature in a vehicle interior of the vehicle, the vehicle is provided with a power conversion circuit driving a rotary machine provided in the temperature reducing device and having an output to which the receiving port is electrically connected, wherein the power conversion circuit charges the secondary battery with the power supplied from the receiving port, the power conversion circuit is positioned such that a temperature of the power conversion circuit is possible to be reduced by driving the temperature reducing device, and the controller is configured to further plan an interruption process to reduce the temperature of the power conversion circuit, the interruption process being performed by driving the temperature reducing device, the interruption process being performed within a duration during which the secondary battery is charged with the power supplied from the receiving port.

5. The power control system according to claim 4, wherein the controller is configured to plan to charge the secondary battery such that energy stored in the secondary battery which is consumed by driving the temperature reducing device is compensated.

6. The power control system according to claim 5, wherein the controller is configured to make an amount of energy that is to be charged into the secondary battery to compensate for driving the temperature reducing device larger with an increase in an amount of energy to be charged into the secondary battery.

7. The power control system according to claim 4, wherein the controller is configured to plan a reduction in interruption intervals at which the power supply process is interrupted to perform the interruption process in cases where the amount of power supplied from the receiving port is made larger in charging the secondary battery.

8. The power control system according to claim 4, wherein the controller is configured to perform the interruption process which is performed by driving the temperature reducing device, regardless of the planned power supply process, in cases where the temperature of the power conversion circuit is over a threshold temperature.

9. The power control system according to claim 1, wherein the on-vehicle electric devices include a temperature adjusting device for adjusting a temperature in a vehicle interior of the vehicle, the vehicle is provided with a power conversion circuit driving a rotary machine provided in the temperature adjusting device and having an output to which the receiving port is electrically connected, wherein the power conversion circuit charges the secondary battery with the power supplied from the receiving port, and the controller is configured to further perform a request for ending adjustment of the temperature of the vehicle interior at a specified time instant, set a drive period of the temperature adjusting device, the driving period being according to the request, to a charging prohibiting period of the secondary battery.

10. The power control system according to claim 1, wherein the on-vehicle electric devices include a power conversion circuit charging the secondary battery and a temperature adjusting device for adjusting a temperature in a vehicle interior of the vehicle, the temperature adjusting device cools down a temperature of the power conversion circuit, and the controller is configured to plan an interruption process during a period in which the second battery is charged with power supplied from the receiving port, the interruption process reducing the temperature of the power conversion circuit by driving the temperature adjusting device, and charging of the secondary battery such that an amount of energy stored in the secondary battery, which is consumed by driving the temperature adjusting device, is compensated.

11. The power control system according to claim 1, wherein the controller is configured to acquire a charging request for the secondary battery in a period continuing until a start of an upcoming run of the vehicle, and wherein the controller is configured to plan the power supply process for the vehicle stop based on the charging request.

12. The power control system according to claim 11, wherein the controller is configured to allow to receive information indicative of a priority of the charging request from outside the system, and the controller is configured to decide an amount of electric energy to be supplied to the secondary battery based on the priority of the charging request, when there is a request for requesting an amount of electric energy exceeding an amount of electric energy available for the on-vehicle electric devices in the period continuing until the start of the upcoming run of the vehicle.

13. The power control system according to claim 1, wherein the controller is configured to acquire a drive request for on-vehicle electric devices in a period continuing until a start of an upcoming run of the vehicle, the on-vehicle electric devices including the secondary battery, and wherein the controller is configured to plan the power supply process while the vehicle is stopped, based on the acquired drive request.

14. The power control system according to claim 13, wherein the controller is configured to receive information indicative of a priority of the drive request, and the controller is configured to decide an amount of electric energy to be supplied to the on-vehicle electric devices based on the priority of the drive request, when there is a request for requesting an amount of electric energy exceeding an amount of electric energy available for the electric loads in the period continuing until the start of the upcoming run of the vehicle.

15. The power control system according to claim 1, further comprising:
an inputting device configured to input a user's request, the user's request being at least one of a request for charging the secondary battery and a request for driving the on-vehicle electric devices included in the electric loads, the user's request being inputted in a period continuing until a start of an upcoming run of the vehicle; and
an outputting device configured to output to the user information indicative of a limitation of an amount of electric energy to be supplied to the electric loads until the start of the upcoming run of the vehicle, if there is a request for requesting an amount of electric energy exceeding an amount of electric energy available for the electric loads in the period until the start of the upcoming run of the vehicle,
wherein the vehicle is provided with a power conversion circuit driving a rotary machine provided in the temperature adjusting device and having an output to which the receiving port is electrically connected, wherein the power conversion circuit charges the secondary battery with the power supplied from the receiving port.

16. The power control system according to claim 1, wherein the on-vehicle electric devices include a temperature adjusting device adjusting a temperature in a vehicle interior of the vehicle, and
the vehicle is provided with a power conversion circuit driving a rotary machine provided in the temperature adjusting device and having an output to which the receiving port is electrically connected, wherein the power conversion circuit charges the secondary battery with the power supplied from the receiving port,
wherein the power control system further comprises an inputting device configured to input a user's request and information indicative of a priority of the user's request, the user's request being at least one of a request for charging the secondary battery and a request for driving the temperature adjusting device, the user's request being inputted in a period continuing until a start of an upcoming run of the vehicle, and
wherein the controller is configured to change at least one of the requests for charging the secondary battery and driving the temperature adjusting device from the beginning depending on the priority, if an amount of energy requested for charging the secondary battery and driving the temperature adjusting device exceeds an amount of electric energy available for the on-vehicle electric devices in a period continuing until a start of an upcoming run of the vehicle.

17. The power control system according to claim 1, wherein the on-vehicle electric loads includes on-vehicle electronic devices, and
the controller is configured to allocate unit power amounts in corresponding time slots among the time slots, regardless of the power cost, to unit power amounts specified among the unit power amounts divided, the specified unit power amounts being for the on-vehicle electronic devices.

18. The power control system according to claim 17, wherein the controller is configured to allocate the divided unit power amounts by:
determining whether or not there is no unit power amount whose cost has not been allocated, among the unit power amounts whose costs are set, after all the divided unit power amounts are allocated to the unit power amounts whose costs are set,
making a comparison between a first cost and a second cost when it is determined that there is present a unit power amount to which the cost has not been allocated, the first cost being required in a situation where the unit power amount with no allocation is used to charge the secondary battery and power charged in the secondary battery is used to supply power whose supply duration is specified, to a corresponding on-vehicle electronic device among the on-vehicle electronic devices in the specified duration, the second cost being required in a situation where the power is supplied to the corresponding on-vehicle electronic device in the specified duration without using the secondary battery, and changing the allocation such that the power charged in the secondary battery is used, when the controller determines that the first cost is lower than the second cost.

19. The power control system according to claim 1, wherein the controller is further configured to:
determine whether or not the unit power amounts of the predicted available power amount have, every time slot, unit power amounts to which at least one of the unit power amounts of the consumed amount of power and the required charging amount of power is not allocated;
calculate whether or not an alternative battery mounted in the vehicle should supply power to the on-vehicle electric loads instead of supplying the power from the external power supply via the receiving port; and
adjust the allocated unit power amounts of the predicted available power amount depending on the calculation as to whether or not the alternative battery mounted in the vehicle should supply power to the on-vehicle electric loads instead of supplying the power from the external power supply via the receiving port.

20. A method of controlling power transmission in a power control system being mounted in a vehicle, the power control system comprising: a receiving port configured to be electrically connected to an external power supply device placed outside the vehicle; a secondary battery provided in the vehicle and configured to capable of storing therein power supplied from the external power supply device via the receiving port; a power supply device provided in the vehicle and configured to supply power to on-vehicle electric loads which consume power supplied; and a controller, wherein the method is performed by the controller and comprises, the method comprising steps of:
acquiring information indicative of future power cost information predicted currently, the future power cost information including information indicative of power cost in a duration of time from a current time instant at which the vehicle is stopped to a time instant at which the vehicle is predicted to start next;
obtaining i) an available power amount which is predicted as being available via the receiving port, and ii) both an amount of power consumed by the on-vehicle electric loads and an amount of charging power required to charge the secondary battery; and planning a power supply process performed during the duration of time the power supply process including a process of: i) supplying the electric loads with the consumed amount of power required during the duration of time; and ii) supplying the secondary battery with the required charging amount of power, the power supply process being planned based on a prediction calculated based on both the future power cost information and the obtained amounts of consumed power and required charging power, wherein the planning step comprises steps of:
(i) dividing each of the predicted available power amount, the amount of consumed power, and the amount of required charging power into a set of unit power amounts with two-dimensional addresses, a one-dimensional address of the two-dimensional addresses showing time slots provided by dividing the duration of time by a predetermined period of time, wherein the other dimensional addresses of the set of unit power amounts of the predicated available power amount show an available power amount in each of the time slots, the unit power amounts accompanying cost information based on the future power cost information, and the one-dimensional addresses of both the set of the amount of consumed power and the set of the amount of required charging power are set to be blanked except for designated time slots corresponding to a drive time of the on-vehicle electric loads;

(ii) first allocating, of the unit power amounts divided from the consumed amount of power, every time slot, the unit power amounts residing in the time slots assigned to the drive time, to the corresponding unit power amounts of the predicted available power amount;

(iii) second allocating, to the remaining unit power amounts of the predicted available power amount, every time slot, the unit power amounts of the consumed amount of power and the unit power amounts of the required charging amount of power; and (iv) activating the power supply device based on the planned power supply process such that the power supply process is performed.

21. The method according to claim 20, wherein the second allocating step is performed such that the remaining unit power amounts of the predicted available power amount are subjected to the allocation in an ascending order of power cost shown by the cost information accompanied by the unit power amounts of the predicted available power amount, the ascending order starting from lower cost of the power to higher cost of the power.

22. The method according to claim 21, wherein the planning step further comprises steps of:
determining whether or not the unit power amounts of the predicted available power amount have, every time slot, unit power amounts to which at least one of the unit power amounts of the consumed amount of power and the required charging amount of power is not allocated;
calculating whether or not an alternative battery mounted in the vehicle should supply power to the on-vehicle electric loads instead of supplying the power from the external power supply via the receiving port; and
adjusting the allocated unit power amounts of the predicted available power amount depending on the calculation as to whether or not the alternative battery mounted in the vehicle should supply power to the on-vehicle electric loads instead of supplying the power from the external power supply via the receiving port.

* * * * *